United States Patent [19]

Counselman, III

[11] Patent Number: 4,912,475

[45] Date of Patent: Mar. 27, 1990

[54] TECHNIQUES FOR DETERMINING ORBITAL DATA

[75] Inventor: Charles C. Counselman, III, Belmont, Mass.

[73] Assignee: Massachusetts Institute of Technology, Cambridge, Mass.

[21] Appl. No.: 330,976

[22] Filed: Mar. 29, 1989

Related U.S. Application Data

[63] Continuation of Ser. No. 28,712, Mar. 20, 1987, abandoned.

[51] Int. Cl.$^4$ .................. H04B 7/185; G01S 5/02; G01C 21/00
[52] U.S. Cl. .................. 342/352; 342/424; 364/459
[58] Field of Search .............. 342/352, 356, 357, 358, 342/424; 364/459

[56] References Cited

U.S. PATENT DOCUMENTS

| | | | |
|---|---|---|---|
| 4,387,376 | 6/1983 | Sherrill et al. | 342/424 |
| 4,647,942 | 3/1987 | Counselman, III | 343/797 |
| 4,667,203 | 5/1987 | Counselman, III | 342/357 |
| 4,809,005 | 2/1989 | Counselman, III | 342/352 |

FOREIGN PATENT DOCUMENTS 2120489 2/1986 United Kingdom .

OTHER PUBLICATIONS

King et al., *Surveying with GPS*, Monograph, No. 9, School of Surveying, Univ. of New South Wales, 1985.
Bossler et al., Using the Global Positioning System for Geodetic Positioning, pp. 553–563, Bull. Géod. 54 (1980).
W. N. Christensen and J. A. Hogbom, Chap. 7, Entitled "Aperture Synthesis", pp. 171–189, of Book Entitled "Radiotelescopes", Published in 1969 by the Cambridge University Press, England.
A. E. E. Rogers, "Very Long Baseline Interferometry with Large Effective Bandwidth for Phase Delay Measurements", Radio Science, vol. 5, No. 10, pp. 1239–1247, Oct., 1970.
A. E. E. Rogers, "Broad-Band Passive 90° RC Hybrid with Low Component Sensitivity for Use in the Video Range of Frequencies", Proceedings of the IEEE, vol. 59 (1971), pp. 1617–1618.
C. C. Counselman, III and I. I. Shapiro, "Miniature Interferometer Terminals for Earth Surveying," *Proceedings of the Second International Symposium on Satellite Doppler Positioning*, vol. 11, pp. 1237–1286, Jan. 1979, Available from the University of Texas at Austin.

(List continued on next page.)

*Primary Examiner*—Thomas H. Tarcza
*Assistant Examiner*—Gregory C. Issing
*Attorney, Agent, or Firm*—Morgan & Finnegan

[57] ABSTRACT

Techniques are disclosed for determining orbital data of space borne vehicles including earth satellites such as those of the NAVSTAR Global Positioning System. Each of a set of such satellites transmits signals which include carrier waves which may be suppressed, or only implicity present. The signals are received from the observable satellites concurrently by means of an antenna at each of at least three ground stations forming a network of baselines. The stations are arrayed such that the ratio of the maximum to the minimum baseline length is much greater than one. From the signals received at a station pair forming each baseline a time series of doubly-differenced phase measurement data is formed which is biased by an integer number of cycles of phase. The data series for different satellite and station pairs are processed together to determine the orbits of the satellites and the doubly-differenced phase biases. Unique determination of the integer values of at least some of the biases is facilitated by the above noted spatial arrangement of the stations such that the ratio of the maximum to the minimum baseline length is much greater than one. This integer bias determination enhances the accuracy of the related orbit determination.

Unique determination of the integer values of at least some of the doubly-differenced carrier phase biases may also be facilitated by the use of a plurality of carrier frequencies with the ratio of the maximum to the minimum frequency being much greater than one.

18 Claims, 6 Drawing Sheets

OTHER PUBLICATIONS

C. C. Counselman, III, I. I. Shapiro, R. L. Greenspan & D. B. Box, Jr., "Backpack VLBI Terminal with Subcentimeter Capability", National Aeronautics & Space Admin. Conference Publication 2115, Entitled "Radio Interferometry Techniques for Geodesy", pp. 409–414, Published in 1979.

C. C. Counselman, III et al., "Very Long Baseline Interferometric Geodesy with GPS Satellites", Proposed to NASA, Jul., 1980.

Ron Hatch, "The Synergism of GPS Code and Carrier Measurements", *Proceedings of Third International Geodetic Symposium on Satellite Doppler Positioning*, vol. 2, pp. 1213–1231, Presented in Feb. of 1982 by the Physical Science Laboratory of the New Mexico State University.

G. Beutler, D. A. Davidson, R. B. Langley, R. Santerre, P. Vanicek and D. E. Wells, "Some Theoretical and Practical Aspects of Geodetic Positioning Using Carrier Phase Difference Observations of GPS Satellites", Published in Jul. 1984 as *Technical Report No. 109* of Department of Surveying Engineering, of the University of New Brunswick, Canada.

R. I. Abbot, Y. Bock, C. C. Counselman, III, R. W. King, S. A. Gourevitch and B. J. Rosen, Entitled "Interferometric Determination of GPS Satellite Orbits", *Proceedings of the First International Symposium on Precise Positioning with the Global Positioning System*, vol. 1, pp. 63–72, Published May 1985 by the National Geodetic Information Center, National Oceanic and Atmospheric Administration, Rockville, Md., 20852, U.S.A.

G. Beutler, W. Gurthner, I. Bauersima and R. Langley, Entitled "Modeling and Estimating the Orbits of GPS Satellites", *Proceedings of the First International Symposium on Precise Positioning with the Global Positioning System*, vol 1, pp. 99–112, Published May 1985 by the National Geodetic Information Center, National Oceanic and Atmospheric Administration, Rockville, Md, 20852, U.S.A.

Bock et al., "Establishment of Three-Dimensional Geodetic Control by Interferometry with the Global Positioning System", JGR, vol. 90, No. B9, pp. 7689–7703, Aug. 10, 1985.

R. W. King, E. G. Masters, C. Rizos, A. Stolz and J. Collins, Monograph, No. 9, Entitled "Surveying with GPS", Published by the School of Surveying, The University of New South Wales, Kensington, N.S.W. 2033, Australia, Nov. 1985.

E. Beutler, W. Gurtner, M. Rothacher, T. Schildknecht and I. Bauersima, "Evaluation of the 1984-Alaska-GPS-Campaign With the Bernese Second Generation Software".

G. Beutler, W. Gurtner, M. Rothacher, T. Schildknecht and I. Bauersima, "Using the Global Positioning System (GPS) for High Precision Geodetic Surveys: Highlights and Problem Areas", IEEE Plans" 86 Position Location and Navigation Symposium Record", pp. 243–250, Published 1986 by Institute of Electrical & Electronics Engineers, New York.

G. Beutler, W. Gurtner, M. Rothacher, T. Schildknecht and I. Bauersima, Entitled "Determination of GPS Orbits Using Double Difference Carrier Phase Observations from Regional Networks", in the *Proceedings of the fourth International Geodetic Symposium on Satellite Positioning*, vol. 1, pp. 319–335, Published in 1986 by the Applied Research Laboratories of the University of Texas at Austin.

Y. Bock, S. A. Gourevitch, C. C. Counselman, III, R. W. King and R. I. Abbot, "Interferometric Anslysis of GPS Phase Observations", *manuscripta geodaetica*, vol. 11, pp. 282–288; Manuscript Rec'd by the Journal Apr. 2, 1986; Published Dec., 1986.

Burkhard Schaffrin and Yehuda Bock, "A Unified Scheme for Processing GPS Dual-Band Phase Observations," 15-page Manuscript Submitted to Bulletin Geodesique, Dec. 3, 1986.

TECHNIQUES FOR DETERMINING ORBITAL DATA

The U.S. government has rights in this invention pursuant to Contract Number F19628-86-K-0009 awarded by the Department of the Air Force.

This is a continuation of co-pending application Ser. No. 028,712, filed Mar. 20, 1987, abandoned July 25, 1989.

TABLE OF CONTENTS

1. Background of the Invention
   1.1. Field of the Invention
   1.2. The Global Positioning System
      1.2.1. GPS Satellite Orbits
      1.2.2. Transmitted Signals
         1.2.2.1. Carriers and Modulation
         1.2.2.2. Carrier Reconstruction
   1.3. Deriving Position Information from GPS Signals
      1.3.1. Using Carrier Phase
      1.3.1.2. Ambiguity Resolution
      1.3.1.3. Effect of Orbital Uncertainty
      1.3.1.4. Avoiding Ambiguity Resolution
      1.3.1.5. Orbit Determination
2. Summary of the Invention
3. Brief Description of the Drawings
4. Detailed Description of Preferred Embodiment
   FIG. 1. System of Stations Linked to Data Processor
   FIG. 2. Tracking Station
   FIG. 3. Receiver
   FIG. 4. Tracking Channel
   FIG. 5. 616 $f_0$ Detector
   FIG. 6. Range Generator

1. BACKGROUND OF THE INVENTION

1.1. Field of the Invention

This invention relates to improved techniques for determining orbital data of space traveling objects such as earth satellites, and more particularly to improved radio interferometric methods and instrumentation for determining such data.

Orbital data are data representative of the path of a satellite in space and, more specifically, of the position of a satellite at a particular time or as a function of time. Orbital data may represent an orbit in various ways. For example, a satellite's position and velocity vectors may be specified in rectangular coordinates at a certain epoch. Alternatively, the elements of an osculating or a mean ellipse may be given.

Radio interferometric data such as differences of carrier phase observations of satellite signals from a pair of receiving stations constitute a kind of orbital data. However, the present invention concerns the combination of carrier phase data from three or more receivers and the processing of the combined data to determine data more directly representative of the path or position of a satellite in space. Therefore, the term "orbital data" will be used herein to refer to the latter data, and the term "orbit determination" will be used to refer to the process of deriving such orbital data from the phase measurement data.

Although the invention is disclosed with reference to the satellites of the NAVSTAR Global Positioning System, or "GPS", it applies as well to the determination of orbital data of other space traveling, radio transmitting objects, such as the Soviet GLONASS satellites and certain other space craft.

1.2. The Global Positioning System

The GPS is now in the process of being deployed by the U.S. Department of Defense, and will be used mainly for purposes of navigation and position determination. About seven satellites of the GPS now orbit the earth and transmit radio signals by which users can determine their positions on earth.

1.2.1. GPS Satellite Orbits

When complete, the Global Positioning System is expected to include about 21 satellites orbiting the earth in three planes. About seven satellites will be distributed around a geocentric circular orbit in each of these planes; each plane will be inclined to the earth's equator by an angle of about 55 degrees; and the equator crossing points, or nodes, of the orbits will be about equally spaced in longitude, about 120 degrees apart.

The altitudes of the orbits above the surface of the earth are all about 20,000 km, and the common orbital period is about 24 hours as viewed from the rotating earth. Thus, the GPS satellites are not "geostationary", but each appears to a ground-based observer to rise, move through the sky, and set daily. From any given point on the earth's surface, at least four satellites will be in view at any time, 24 hours per day. Because the orbits are so high, a given satellite at a given time may be seen from widely separated points on the earth's surface.

1.2.2. Transmitted Signals

Each GPS satellite transmits microwave L-band radio signals continuously in two frequency bands, centered at 1575.42 MHz and 1227.60 MHz and known as the "L1" and the "L2" bands, respectively. Within each of these GPS bands, the transmitted signal is a broadband, noise-like, pseudorandom signal which contains no discrete spectral components. The signals are therefore said to be carrier-suppressed.

1.2.2.1. Carriers and Modulation

The term "carrier" is used herein in the same sense as is usual in the radio art; that is, a carrier is a periodic wave of essentially constant amplitude, frequency, and phase. Information may be conveyed, or "carried" by varying the amplitude, frequency and/or phase of such a signal. A carrier may be called a "subcarrier" if its frequency is less than the bandwidth of the signal. A signal may include several carriers. For example, a broadcast television signal is said to include a video carrier and an audio carrier.

Although no carriers are present in the GPS signals as transmitted, various carriers may be said to be implicit therein, in that such carriers may be recovered or reconstructed from the GPS signals.

Within each GPS satellite, a stable frequency standard such as an atomic cesium beam device provides a fundamental frequency of 5.115 MegaHertz, called $f_0$, from which all other critical satellite frequencies are derived by integer multiplication or division. The frequency of the L1 band center frequency carrier of GPS signals is 308 times $f_0$ or 1575.42 MegaHertz, and the frequency of the L2 band center frequency carrier is 240 times $f_0$ or 1227.60 MegaHertz. The $f_0$ fundamental frequency is a carrier frequency which may be reconstructed from the GPS signals.

GPS signals are bi-phase or quadriphase modulated. In particular, quadrature components of an L band center frequency carrier are multiplied, in the satellite, with pseudorandom, binary valued waves m(t) and n(t). The m(t) and n(t) waveforms are aperiodic, but periodic carrier waves are implicit in them. Polarity or phase reversals of m(t) and n(t) occur only at times which are integer multiples of fixed time intervals tm and tn known as the chip widths of m(t) and n(t), respectively.

If m(t) reversed Polarity at every multiple of tm, then m(t) would be a periodic square wave with a frequency equal to 1/(2tm). Because the polarity reversals actually occur pseudorandomly, just half the time on average, the 1/(2tm) frequency carrier wave is suppressed, as is the band center frequency carrier.

Similarly, if n(t) reversed polarity at every multiple of tn, then n(t) would be a periodic square wave with a frequency equal to 1/(2tn). Again, because n(t) reverses polarity pseudorandomly, both the 1/(2tn)-frequency carrier and the band center frequency carrier are suppressed.

In each GPS satellite's transmitter, one quadrature component of the 308 $f_0$ or 1575.42 MHz, L1 band center frequency carrier is modulated with m(t), which has chip width tm equal to 5/$f_0$ or about 977.5 nanoseconds. The orthogonal component of the L1 band center frequency carrier is modulated with n(t), which has chip width tn equal to 1/(2$f_0$) or about 97.75 nanoseconds. The 240 $f_0$ or 1227.60 MHz, L2 band center frequency carrier is modulated with only n(t). Thus, in the spread spectrum signal transmitted in the L1 band, at least three different carrier waves are implicitly present, with frequencies of $f_0$/10 (equal to 0.5115 MHz), $f_0$ (equal to 5.115 MHz), and 308 $f_0$ (equal to 1575.42 MHz). In the spread spectrum signal transmitted in the L2 band, at least two different carrier waves are implicitly present, with frequencies of $f_0$ (5.115 MHz) and 240 $f_0$ (1227.60 MHz).

Other carrier frequencies may also be implicit in the GPS signals. For example, the m(t) wave is itself the product of several waves whose time intervals between polarity reversals are fixed integer multiples of tm. Thus, additional carriers whose frequencies are corresponding submultiples of 1/(2 tm) are implicitly present. One of the waveforms or factors multiplied together to produce m(t), known as the "C/A" code waveform or C/A code sequence, is a satellite-specific, pseudorandom, binary sequence of 1023 chips repeated periodically with a period of 1 millisecond, or a frequency of 1 kiloHertz.

Another factor in m(t) is a stream of binary "navigation" data having a 20-millisecond chip width, thus a 25 Hertz carrier frequency. These data include the current time indicated by the satellite's clock, a description of the satellite's current position in orbit, and a description of corrections to be applied to the time indicated by the satellite's clock. These data are broadcast by the satellites for use in the process of determining the position of a receiver from measurements of the received signals. Similar or identical data may be included in the n(t) wave which may modulate both the L1 and the L2 band center frequency carriers.

1.2.2.2. Carrier Reconstruction

Various techniques are known for reconstructing carrier waves from the spread spectrum signal received from a GPS satellite. In the conventional technique, the received signal is multiplied by a replica, generated locally, of the satellite-specific C/A code waveform present in m(t), or of the "P" or "Y" code which is present in n(t). In other techniques, no code sequence is generated in the receiver. Such codeless techniques may be utilized when the relevant code is unknown or to avoid code dependence.

An aspect of some carrier reconstruction techniques, including the codeless technique used in the preferred embodiment of the present invention described hereinbelow, is that the second harmonic rather than the fundamental frequency of an implicit carrier is reconstructed. In the preferred embodiment, second-harmonic frequencies of 616 $f_0$ and 2 $f_0$ are reconstructed from the GPS signals received in the L1 band, and frequencies of 480 $f_0$ and 2 $f_0$ are reconstructed from the signals received in the L2 band.

1.3. Deriving Position Information from GPS Signals

Various methods are known for deriving position information from a signal received from a GPS satellite. In some methods, the time delay of the pseudorandom code modulation of the signal is measured. In others, the phase of a periodic carrier wave implicit in the signal is measured. Time delay and carrier phase measurements may be combined. In any case, information relating both to the position of the receiver and to the position of the orbiting satellite is obtained. The present invention is primarily concerned with the determination of orbital position information.

1.3.1. Using Carrier Phase

The position information obtainable by measuring the phase of a GPS carrier wave, especially one of the relatively short wavelength, L1 or L2 band center frequency carriers, is potentially much more accurate than the information obtainable by measuring the modulation delay. However, the potential accuracy of carrier phase information can be difficult to achieve because carrier phase measurements are ambiguous. Their full potential cannot be realized unless the ambiguity problem can be resolved.

Because resolving phase ambiguity is an important aspect of the present invention, this problem and known methods of attacking or avoiding it are reviewed hereinbelow. The ambiguity problem is a fundamental one affecting all types of phase measurements, but its nature and the difficulty of solving it depend strongly on the techniques used to collect and process the measurements. The nature of the ambiguity problem, whether it can be solved, and if so how, depend particularly on how well the positions of the satellite and the receiving station are known. Uncertainty in knowledge of a satellite orbital position causes more serious difficulty in solving the ambiguity problem than uncertainty in a fixed receiver position.

Which position is unknown is critical because, for example, a fixed receiver position may be specified for the entire time span of an extensive set of observations, by the values of just three coordinates (for example, latitude, longitude, and height). On the other hand, a minimum of six parameters must be specified to define the orbit of a satellite, even for a relatively short time span.

Techniques are known for solving the carrier phase ambiguity problem in determining unknown receiver coordinates, but only when the relevant satellite orbital parameters are relatively well known. The most efficient techniques known for receiver position determination rely on a method of phase data processing known as "double differencing". In double difference phase processing, as described below, the problem of resolving carrier phase ambiguity appears as a problem of determining integer numbers called ambiguity parameters.

The present invention addresses the problem of phase ambiguity in the context of determining unknown orbital parameters. This problem, as mentioned, is much more difficult than the ambiguity problem in determining unknown receiver position coordinates.

To determine unknown orbital parameters, it is known to use double difference phase processing. When this is done, however, the orbital uncertainty interferes with determination of the integer values of the ambiguity parameters. Because the ambiguity parameters cannot be determined, in other words because the ambiguity of carrier phase is not resolved, the accuracy of the orbit determination is degraded.

The difficulty of resolving phase ambiguity in the orbit determination process is such that the usually recommended procedures do not include any attempt to resolve phase ambiguity The present invention enables more accurate orbit determination by improving the ability to resolve phase ambiguity in the process. As an aid to understanding the invention, known methods of resolving ambiguity, usable in the determination of an unknown receiver position when orbits are already accurately known, are reviewed hereinbelow. Why known methods of resolving ambiguity fail when the orbits are unknown is also discussed.

1.3.1.1. Double Differencing

As mentioned, it is known to determine the position of a receiver by measuring the phase of a carrier wave implicit in signals received from a GPS satellite. The most accurate methods involve comparing the phases of the carrier waves of signals received simultaneously from different satellites. Carrier waves (or their second harmonics) are reconstructed from the received signals, and the phases of these carriers are measured with respect to a local reference oscillator in the receiver. The carrier phase measurement data are processed to determine position coordinates of the receiver.

Known methods of processing address the fact that carrier phase measurements are corrupted by additive biases. The biases stem from three sources: (1) The measured phase includes the phase of the transmitting oscillator in the satellite. This phase is not only random; it varies randomly with time. (2) The phase of the receiver's local oscillator has been subtracted from the measured phase. This phase also varies randomly with time. (3) In addition, the measured phase is biased by an unknown integer number of cycles because a carrier wave is a periodic wave. This integer cycle bias represents the inherent ambiguity of a carrier phase measurement.

Carrier phase measurements are ambiguous because a carrier wave is a periodic wave. One cycle of any periodic phenomenon is, by definition, indistinguishable from any other cycle. By observing a periodic wave such as a reconstructed GPS carrier signal continuously, one can determine its phase changes unambiguously. The total value of a phase change, including both the integer number of cycles and the additional fraction of a cycle, can be observed. However, without more information one cannot determine the initial value of the phase.

Because the initial value is unknown, a continuous series of phase measurements has an unknown, constant bias. As long as the bias is unknown, useful information can not be derived from the average, or mean, value of the series of measurements. Although useful information is contained in the variation about the mean, the mean value will only contain useful information if the bias can be determined.

The bias of a series of carrier phase measurements stemming from the phase of any given satellite's oscillator may be cancelled by subtracting measurements of that satellite's signal made simultaneously at two different receiving stations. The resulting between-stations difference observable is still useful for determining the position of one receiver if the position of the other is known.

The bias of a series of carrier phase measurements stemming from the phase of any given receiver's oscillator may be cancelled by subtracting simultaneous measurements by that receiver of two different satellites. The resulting between-satellites difference observable is still useful for determining the position of the receiver.

Biases related to both kinds of oscillators are canceled if both types of differencing are employed: between stations and between satellites. This is known as double-differencing, or doubly differenced phase processing.

The double differencing method requires a plurality of satellites to be observed simultaneously at each of a plurality of receiving stations. At each station, carriers are reconstructed from the received signals, and the carrier phases are measured with respect to the local reference oscillator, for all the satellites at the same time. Then differences are taken between phases measured for different satellites at the same time, in order to cancel the common errors associated with the local oscillator phase.

Carrier phase measurements from three or more receivers at a time may be combined in a double-differencing mode. If at a specific epoch, n receivers observed m satellites, then $(n-1)(m-1)$ linearly independent double differences can be formed. An efficient algorithm for combining carrier phase data from more than two receivers is described in the article by Yehuda Bock, Sergei A. Gourevitch, Charles C. Counselman III, Robert W. King, and Richard I. Abbot, entitled "Interferometric Analysis of GPS Phase Observations", appearing in the journal *manuscripta geodaetica*, volume 11, pages 282–288, published in 1986. As disclosed hereinbelow, the present invention involves the combination, in a doubly differenced mode, of measurements made by three or more receivers.

1.3.1.2. Ambiguity Resolution

An important consequence of the cancellation of transmitter and receiver oscillator phase contributions in doubly differenced phase measurements is that the constant bias of a continuous measurement series (due to ignorance of the initial value) is an integer number of cycles of phase. Sometimes the value of this integer can be determined, so that distance- or other position-related information can be derived from the average value of a series of measurements. The process of determining the integer value of the bias of a series of phase measurements is called "resolving the ambiguity" of the series.

Because doubly differenced phase ambiguity resolution is an essential part of the present invention, the concept will be reviewed further as an aid to understanding the invention. The following review uses the notation and some of the language of an article by G. Beutler, W. Gurtner, M. Rothacher, T. Schildknecht, and I. Bauersima, entitled "Using the Global Positioning System (GPS) for High Precision Geodetic Surveys: Highlights and Problem Areas", appearing in the *IEEE PLANS '86 Position Location and Navigation Symposium Record*, pages 243–250, published in 1986 by the Institute of Electrical and Electronics Engineers, New York. For clarity, many details are omitted here.

Let L represent the wavelength of a reconstructed carrier wave, that is, the speed of light c divided by the reconstructed carrier frequency. In the case of a receiver which reconstructs the second harmonic of an implicit carrier frequency, the wavelength is computed from twice the implicit carrier frequency.

Let $r^i_k$ represent the distance or "range" between receiver k at the reception and measurement time, t, and satellite i at the time of transmission, $(t - r^i_k/c)$.

Let $f_k$ represent the phase of the $k^{th}$ receiver's local reference oscillator, and let $f^i$ represent the phase of the $i^{th}$ satellite's transmitting oscillator.

Then the so-called "one way" phase observable $f^i_k$, for the signal received from the $i^{th}$ satellite at the $k^{th}$ receiver, is given theoretically by the equation $$f^i_k = f^i - f^i_k - f_k - (1/L)r^i_k + N^i_k, \text{ tm (Eq. 1)}$$

where all phases are expressed in cycles and $N^i_k$ is an integer expressing the intrinsic ambiguity of this phase observable.

Four one-way phases measured at the same epoch t, at a pair of receiving stations k and q and for pair of satellites i and j, are differenced to form a doubly differenced observable:

$$DDf^{ij}_{kq} = (f^i_k - f^i_q) - (f^j_k - f^j_q). \quad \text{(Eq. 2)}$$

Again, subscripts denote receivers and superscripts denote satellites. The double differencing cancels the transmitter and the receiver oscillator phases. The effects of the differences between the satellite-to-receiver distances, and a bias which is an integer number of cycles, remain:

$$DDf^{ij}_{kq} = -(1/L)DDr^{ij}_{kq} + N^{ij}_{kq}. \quad \text{(Eq. 3)}$$

Here, $DDr^{ij}_{kq}$ is the doubly differenced range, and $N^{ij}_{kq}$ is the integer bias, sometimes called the "ambiguity parameter".

Determining uniquely the true integer value of the unknown bias of a continuous series of doubly-differenced phase observations is called "resolving the ambiguity" of the series. If the ambiguity parameter of a series can be determined, it may be subtracted from each observation in the series, or otherwise accounted for. Then useful information may be derived from the average value of the series of measurements. Thus, the value of an observation series is enhanced by determination of the bias.

In general, a series of observed values of doubly-differenced phase is composed of a mean, or average, value, plus a variation about the mean. Both the mean value and the variation about the mean contain potentially useful information about the positions of the satellites and the receivers. The mean value of the phase is related to the mean of the doubly-differenced satellite-receiver distance, and the variation of the phase is related to the variation of this distance.

If the mean value includes an additive bias which is unknown, then one does not know the value of the position-related part, so it is difficult to derive meaningful position information from the mean value. However, once the additive bias is known, the position-related part of the mean value of the observed phase is known and can contribute to determining the positions of the receivers.

If the positions of the satellites were unknown and the additive bias could be determined, the mean value of the observed phase could contribute to determining the positions of the satellites. Determining the additive bias and applying the mean value information to determine the positions of satellites is an aspect of the present invention.

One method of determining the integer bias of a series of doubly-differenced phase observations is simply to utilize sufficiently accurate information from an external source to calculate the value of the phase observable with an uncertainty of less than one-half cycle. A simple example of using information from an external source would be the use of independently derived information about the positions of the satellites and the stations to calculate the doubly differenced range, $DDr^{ij}_{kq}$, in Eq. 3. Substituting the actually observed value of the doubly differenced phase for the theoretical value, $DDf^{ij}_{kq}$, in Eq. 3 yields an equation which may be solved for the ambiguity parameter, $N^{ij}_{kq}$.

Another example of using independently derived information to determine the ambiguity parameter is the use of a "parallel" series of doubly-differenced observations, from the same pair of stations and for the same pair of satellites, and at one or more of the same measurement epochs, of the satellite-to-station path length as inferred from the time delay of the code modulation of a satellite signal. This method was proposed in a paper published in 1979 by C. C. Counselman III, I. I. Shapiro, R. L. Greenspan, and D. B. Cox, Jr., entitled "Backpack VLBI Terminal with Subcentimeter Capability", appearing in National Aeronautics and Space Administration Conference Publication 2115, "Radio Interferometry Techniques for Geodesy", on pages 409-414. A detailed development of this method was given in a paper by Ron Hatch, entitled "The Synergism of GPS Code and Carrier Measurements", appearing in the *Proceedings of the Third International Geodetic Symposium on Satellite Doppler Positioning*, volume 2, pages 1213-1231, published in 1982 by the Physical Science Laboratory of the New Mexico State University.

This method relies on the ability to determine the doubly-differenced range from observations of the modulation delay with sufficiently small uncertainty that the bias of the doubly-differenced center frequency carrier phase for the same station pair and satellite pair is computable with less than one-half cycle of error. An important aspect of this method is that it does not require determination or external knowledge of the geometry. The satellite-to-receiver distance, whatever its value, delays the signal modulation and the center-frequency carrier by the same amount. Therefore the ability to resolve ambiguities by this method is essentially independent of uncertainty in available knowledge of the station positions and the satellite orbits.

Unfortunately, it has proven extremely difficult in practice to measure the modulation delay of the signal with sufficient accuracy to ensure correct resolution of the L band center-frequency carrier phase ambiguities, and the utility of this method has so far been rather limited.

Related methods of resolving ambiguities in phase observations of GPS satellites are known in which phases are observed for a plurality of reconstructed carriers including one or more subcarriers. The phase of a subcarrier is indicative of modulation delay.

Methods of resolving ambiguities in which carrier phase observations are made at up to about ten different frequencies, including some closely spaced frequencies, some widely spaced frequencies, and some progressively spaced intermediate frequencies, are also known, as proposed for example by C. C. Counselman III and I. I. Shapiro in the paper entitled "Miniature Interferometer Terminals for Earth Surveying" published in the *Proceedings of the Second International Symposium on Satellite Doppler Positioninq*, Vol. II, pp. 1237-1286, January 1979, available from the University of Texas at Austin. This method is akin to the method of bandwidth synthesis employed for the unambiguous measurement of delay in very long baseline radio interferometry, as described in a publication by A. E. E. Rogers, entitled "Very Long Baseline Interferometry with Large Effective Bandwidth for Phase Delay Measurements", appearing in *Radio Science*, vol. 5, no. 10, pages 1239–1247, October 1970.

Simultaneous observation of different frequencies, and/or the combination of code delay and carrier phase measurements, is also known to be useful for the purpose of determining, and thereby eliminating, the frequency-dependent effects of ionospheric refraction on the satellite signals.

The known multiple-frequency and bandwidth synthesis methods are very much like the above mentioned GPS code-delay method; all are independent of, and do not involve knowledge or determination of, the satellite-station geometry. Unfortunately, the signals transmitted by the GPS satellites are not really suitable for use of the multiple-frequency and bandwidth synthesis methods. A serious problem is that the widths of the GPS L1 and L2 bands are too small in comparison with the frequency spacing between the bands. It is the relatively narrow GPS signal bandwidth which also severely limits the utility of the code-delay method. The reasons behind the limitation are related.

As discussed herein below, the determination of satellite orbital data in accordance with the present invention involves the use of at least three receiving stations preferably including some closely spaced stations, some widely spaced stations, and stations with a progression of intermediate spacings. The spacings in this case refer to geometrical distance. However, an analogy exists between the use of progressively spaced stations and the use of progressively spaced frequencies. Although it may not be feasible to equip the GPS (or any other) satellites to transmit a suitable progression of frequencies, it is indeed feasible to set up an array of tracking stations with a suitable progression of geometrical spacings. In a sense, therefore, the present invention may be said to compensate for the gaps in the GPS frequency spectrum which limit the use of known multi-frequency and related techniques.

Similarly, where a system provides a suitable spacing of frequency components, the dependence on varied base line lengths is reduced.

Of all known methods of resolving ambiguity in doubly-differenced phase observations, probably the most useful, and therefore most widely used in determining unknown station position coordinates when satellite orbital parameters are sufficiently accurately known a priori, is to estimate the ambiguity parameters and the station coordinates simultaneously by least-squares fitting to the doubly-differenced phase observations.

In this method the information which is contained in the variation about the mean of each series serves, in effect, to determine the unknown position-related quantities; from the determinations of these quantities the satellite-to-station path lengths are computed; the computed Path lengths are converted from distance to phase units by dividing by the wavelength, and are doubly differenced; the mean of the doubly differenced phase thus computed is subtracted from the actually observed mean; and the resulting difference is an estimate of the bias. Ideally this estimate is near an integer value and has sufficiently small uncertainty that the correct integer value of the bias can be identified with confidence.

In an extension of this method, every integer value in a finite interval surrounding the estimate of each ambiguity parameter (one for each continuous series of observations) is tested by repeating the least-squares adjustment, or "fit", of all the non-ambiguity parameters to the observations for each trial set of integer values of the ambiguity parameters. For each trial, the sum of the squares of the post-fit differences, or "residuals", between the observed and the corresponding computed values of doubly differenced phase is computed. This sum, which the least-squares fitting process attempts to minimize, indicates the badness of the fit. The particular set of integer values of ambiguity parameters found to have the smallest sum of squares of post-fit residuals is identified. Confidence in the correctness of this identification is indicated by the contrast between the related sum of squares, and the next-smallest sum or sums.

Ambiguity resolution by methods such as these is known to be useful in the processing of carrier phase data when the errors in the theoretically computed values of the phase observables are small in comparison with one cycle of phase. Obviously, if the magnitudes of these errors can approach or exceed one-half cycle, they can prevent the correct determination of the ambiguity parameters. It is known that such errors increase with increasing distance between a pair of receivers. The magnitudes of the phase errors are known to increase with increasing distance between the receiving stations for several reasons.

1.3.1.3. Effect of Orbital Uncertainty

One of the most important reasons is that an error in the assumed knowledge of a satellite's orbit causes an error in the theoretically computed value of a between-stations satellite range difference, such as $Dr^i_{kg}$ for satellite i and stations k and q, which is proportional to the distance between stations k and q. The magnitude of the error is about equal to the inter-station distance multiplied by the orbital error measured in radians of arc as subtended at the midpoint of the baseline (and also as projected in a direction parallel to the baseline in question).

Thus, for example, if the orbital error as seen from a baseline on the ground and in the direction of the baseline is $2 \times 10^{-7}$ radian, then the error in the computed value of $Dr^i_{kg}$ will be 1 centimeter for a 50-kilometer distance, and 10 centimeters for a 500-kilometer distance. For observations of the L1 band center frequency carrier, which has a wavelength of about 19 cm, a $2 \times 10^{-7}$ radian orbital error would probably not cause trouble in the ambiguity resolution process for a 50-km baseline. However, it might for a 500-kilometer baseline.

In general, it is known to use ambiguity resolution when the orbits of the satellites are known a priori with sufficient accuracy, and the distance between receivers is sufficiently short, that the phase error related to the orbital error is small in comparison with one-half cycle and therefore does not interfere with correct integer-cycle bias determination.

It is known to determine the orbits of GPS satellites by Processing doubly-differenced phase observations. But in this processing, as far as is known, doubly-differenced phase ambiguity resolution has not been practiced. The practice of doubly-differenced phase ambiguity resolution has been limited to the determination of unknown receiver positions when the orbits of the satellites have been known a priori with sufficient accuracy. Heretofore, whenever satellite orbits have been substantially unknown a priori, and doubly-differenced phase observations have been processed to determine the orbits, the unknown phase biases or ambiguity parameters have been estimated as real-number (i.e., numerically continuous, as opposed to integer or discrete-valued) unknowns along with the unknown orbital parameters.

Because the sensitivity of the between-stations differenced phase observable to orbital error increases with increasing distance between stations, it is known to use observations from receiving stations separated by the greatest possible distances in order to obtain the most accurate orbit determination. It is customary to use observations from stations separated by thousands of kilometers.

1.3.1.4. Avoiding Ambiguity Resolution

At least two methods of handling ambiguity parameters as continuous variables, rather than integers, are known. In both methods the variables representing the ambiguity, or continuous unknown bias, parameters, are real numbers like the variables representing the satellite orbits, etc. One method is to solve for the unknown ambiguity-related variables explicitly. That is, they are determined by solving a large set of simultaneous equations explicitly including all of the unknown variables. This solution yields estimates of the biases as well as estimates of the other unknowns. Performing such a simultaneous solution was the first step in one of the ambiguity resolution methods described above.

Another method avoids the whole matter of ambiguity parameters. In this method, known as the "implicit bias" method, the biases are eliminated, or solved for only "implicitly", by redefining the observable quantities so that they have no biases. Each series of doubly-differenced phase observations for a given station pair and satellite pair is replaced by itself minus the arithmetic mean, or average, value of the original series. If $DDf(t_i)$ represents the doubly-differenced phase observation at the $i^{th}$ epoch $t_i$, the new, unbiased observation $DDf'(t_i)$ is given by $$DDf'(t_i) = DDf(t_i) - \text{Average of } [DDf(t_i)]. \quad \text{(Eq. 4)}$$

This bias-cancelling operation is performed separately for each doubly-differenced observation series, that is, for each station/satellite pair. Now, ambiguity parameters do not appear at all in the set of equations which is solved to determine the orbital parameters, etc.

In this method, all position related information contained in the mean value of the original series of observations is thrown away when the mean is subtracted. Of course, the information is also wasted in the "explicit" bias determination method if the biases are treated as real numbers and never fixed at their integer values, i.e. if the ambiguities are not resolved. The advantage of the "implicit" method, if the ambiguities are not going to be resolved anyway, is a simplification of the computations, due to the reduction of the number of unknowns to be solved for.

Although there are great differences between the explicit and the implicit methods with respect to practical matters such as computer size, speed, and precision requirements, there is no theoretical difference between these methods regarding the accuracies of the non-bias parameter determinations, provided of course that ambiguity resolution is not considered. Because ambiguity resolution is generally not considered in GPS orbit determination, Beutler and others have recommended the implicit-bias method of processing doubly differenced phase measurements for orbit determination.

1.3.1.5. Orbit Determination

The use of doubly-differenced phase observations for GPS satellite orbit determination is disclosed in an article by R. I. Abbot, Y. Bock, C. C. Counselman III, R. W. King, S. A. Gourevitch, and B. J. Rosen, entitled "Interferometric determination of GPS satellite orbits", appearing in the *Proceedings of the First International Symposium on Precise Positioning with the Global Positioning System*, vol. 1, pages 63–72, published in 1985 by the National Geodetic Information Center, National Oceanic and Atmospheric Administration, Rockville, Md., 20852, U.S.A.

The principles and the practice of GPS satellite orbit determination from doubly differenced carrier phase data are further disclosed in an article by G. Beutler, W. Gurtner, I. Bauersima, and R. Langley, entitled "Modeling and estimating the orbits of GPS satellites", appearing in pages 99–112 of the same *Proceedings* volume, and in an article by G. Beutler, D. A. Davidson, R. B. Langley, R. Santerre, P. Vanicek, and D. E. Wells, entitled "Some theoretical and practical aspects of geodetic positioning using carrier phase difference observations of GPS satellites", published in 1984 as *Technical Report No. 109* of the Department of Surveying Engineering, of the University of New Brunswick, Canada.

The refinement of station position coordinates and a priori satellite orbital parameters by adjusting both simultaneously to fit doubly-differenced phase observations has also been disclosed, for example in the paper by Gerhard Beutler, Werner Gurtner, Markus Rothacher, Thomas Schildknecht, and Ivo Bauersima, entitled "Determination of GPS Orbits Using Double Difference Carrier Phase Observations from Regional Networks", appearing in the *Proceedings of the Fourth International Geodetic Symposium on Satellite Positioning*, volume 1, pages 319–335, published in 1986 by the Applied Research Laboratories of the University of Texas at Austin.

However, the utilization of ambiguity resolution in GPS satellite orbit determination is not known. When the orbits have been substantially uncertain, specifically when the combination of orbital uncertainty and inter-station distance yields phase bias uncertainty approaching or exceeding one-half cycle, then it is not known how to determine the bias parameters with uncertainty small enough to permit unique identification of their integer values. If the explicit solution method is used to estimate the biases simultaneously with the orbital parameters, one tends to find that the uncertainties of the bias estimates are not much smaller than one cycle.

Analysis reveals that the relatively large uncertainties in the estimates of the bias parameters when these parameters are estimated simultaneously with orbital parameters results from the fact that a change in the estimate of a bias parameter may be masked very effectively by certain kinds of changes in the estimates of the unknown orbital parameters. That is, the orbit may be adjusted in a certain way, and the bias parameters also changed, such that the net effects on the calculated values of the doubly-differenced phase observables are less than the measurement uncertainties. In other words, it is theoretically possible to shift the orbit such that the observable quantity changes by a nearly constant amount—which resembles the effect of a change in the bias.

Accordingly, it is said that the bias parameters are difficult to separate from the orbital parameters. It is also said that the bias parameters are correlated with the orbital parameters. The difficulty of separating biases from orbital parameters is greater if the time span of the observations is shorter. However, the difficulty is substantial even if a satellite is observed for the duration of its visible "pass", from horizon to horizon. The difficulty is such that ambiguity resolution has not been considered feasible in the context of orbit determination.

From the difficulty in separating the bias and the orbital parameters, it follows that if some way could be found to determine uniquely the integer values of the biases, then the orbital parameters could be determined more accurately.

2. SUMMARY OF THE INVENTION

It is a general object of the present invention to provide an improved method for determining the orbits of satellites. A more specific object is to enhance the determination of the orbits of satellites by determining uniquely the integer cycle values of the biases of doubly-differenced phase observations of the satellites derived from ground stations and processed to determine the orbits of satellites.

In accordance with the techniques of the present invention, each of a set of such satellites transmits radio signals including carrier waves which may be suppressed, or only implicitly present. The signals are received from the observable satellites concurrently by means of an antenna at each of at least three ground stations. The relative position vector extending from one receiving station to another is called a "baseline vector", or simply a "baseline", and the distance between the stations is called the baseline length. A network of baselines is said to connect the stations. The stations are arrayed such that the ratio of the maximum to the minimum baseline length is much greater than one.

At the same time at each station, carrier phase measurements are made of the signals received from each observable satellite. The measurements are repeated at a series of such times while the satellites move substantial distances in their orbits.

For each observation at a particular station, the phase measurements are differenced between satellites. The phase-difference data at that station are also differenced with the phase difference data derived concurrently at another station and from the same observed satellites, to form a set of doubly-differenced phase data in which the contributions of station-specific and satellite-specific phase errors have been cancelled.

As a consequence, a time series of doubly-differenced phase measurement data is formed which is biased by an integer number of cycles of phase. This series is combined with a series of data from a different baseline, or station pair, and the two data series are processed together to determine the orbits of the satellites. The doubly-differenced phase biases are determined simultaneously with the orbits. Unique determination of the integer values of at least some of the biases is facilitated by the above noted spatial arrangement of the stations wherein the ratio of the longest to the shortest baseline length is much greater than one. This integer bias determination enhances the accuracy of the related orbit determination.

It should be noted that the deliberate use of closely spaced ground stations for orbit determination is contrary to conventional wisdom which teaches that the stations should be as far apart as possible in order to obtain maximum "leverage". The sensitivity of a doubly-differenced phase observable to any orbital parameter, or mathematically speaking the partial derivative of the observable with respect to the orbital parameter, is known to be approximately proportional to the distance separating the relevant pair of stations. However, the magnitudes of the errors present in such an observation do not increase so rapidly with increasing distance between the stations. Therefore the "signal to noise ratio" of the observations is increased, i.e. improved, by increasing the distance. Usually one seeks to maximize the distance, subject to the constraints of economics, politics, geography, and the limited region of mutual visibility of the relevant satellites.

The methodology of the present invention involves a kind of bootstrapping, or positive feedback, which occurs in the determination of the integer biases when closely and widely spaced stations are used together. If the bias of a series of doubly-differenced phase observations is unknown, then the usable information content of the series resides only in the time-variation of the series of observed values. This time-variation information from the observations derived from the most widely spaced stations serves to determine the orbits with sufficiently small uncertainty that the integer biases of other observation series, from closely spaced stations, can be determined uniquely.

The unique determination of these integers enhances the value of the observations from these closely-spaced stations. With their integer biases having been determined, and removed or accounted for, the doubly-differenced phase observations from the more closely spaced stations yield additional information, contained in their average value. This average-value information is in addition to the information contained in the time variation. The average-value information is not available until and unless the bias is removed, because otherwise the unknown bias masks the average value.

The enhancement of the closer-station observations enables the orbital parameters to be determined more accurately, with the result that it becomes possible to determine uniquely the integer biases of observations from more widely spaced stations. The consequent enhancement of these more-widely-spaced-station observations enables the orbital parameters to be determined still more accurately, with the result that it becomes possible to determine the integer biases of observations from still more widely spaced stations, and so on until all biases have been determined uniquely. However, it should be noted that the orbit determination may still be enhanced substantially even if some of the integers remain undetermined, that is, if the integer values of some of the biases are not uniquely determined. It should also be noted that while it is useful to conceptualize the invention as a succession of bootstrapping refinements, in actual practice it may be preferable to process all observations, from all stations, simultaneously in order to determine many or all of the bias parameters simultaneously.

Analysis of the present concept for resolving ambiguity by combining observations from different inter-station spacings reveals analogies to the method of eliminating ambiguity proposed by C. C. Counselman III and I. I. Shapiro in the paper entitled "Miniature Interferometer Terminals for Earth Surveying" published in the *Proceedings of the Second International Symposium on Satellite Doppler Positioning*, Vol. II, pp. 1237–1286, January 1979, available from the University of Texas at Austin, and the method of eliminating ambiguity in the determination of delay in very long baseline radio interferometry, as described in a publication by A. E. E. Rogers, entitled "Very Long Baseline Interferometry with Large Effective Bandwidth for Phase Delay Measurements", appearing in *Radio Science*, vol. 5, no. 10, pages 1239–1247, October 1970. However, the use of observations from one interferometer baseline, i.e. one pair of stations, to resolve ambiguity in the observations from another baseline is not suggested in these publications. In the ambiguity resolution methods described in both of these publications, observations are combined from a wide range of frequencies (or frequency spacings) for a single baseline, rather than from a wide range of geometrical spacings.

An analogy to the present concept for resolving ambiguity by combining observations from different inter-station spacings may also be found in the method of synthesizing a directional antenna beam pattern by combining individual antenna elements having a wide range of geometrical spacings, as described for example by W. N. Christiansen and J. A. Hoghom in Chapter 7, "Aperture synthesis", pages 171–189, of the book entitled "Radiotelescopes", published in 1969 by the Cambridge University Press, England.

Unique determination of the integer values of at least some of the doubly-differenced carrier phase biases in accordance with the present invention may be facilitated by the use of a plurality of carrier frequencies with the ratio of the maximum to the minimum frequency being much greater than one.

As previously noted, and where the satellite carrier frequencies permit, phase measurements of the signals received from each satellite simultaneously at each station may be made for a plurality of carrier frequencies with the ratio of the maximum to the minimum frequency being much greater than one. Determination of the integer values of at least some of the doubly-differenced carrier phase biases is facilitated by the use of such frequencies and thus enhances the accuracy of the orbit determination.

This second, multi-frequency, aspect of the invention, used either separately or together with the first mentioned, multi-spacing aspect, is related to the first aspect in a way which may be appreciated by considering that the sensitivity of the doubly-differenced phase observable to an orbital parameter is proportional not only to the spacing of the stations, as mentioned above, but also to the carrier frequency of the observations. Therefore the sensitivity of the phase observable, measured in cycles, is proportional to the spacing measured in wavelengths at the observing frequency. Thus there is a parallel between (1) exploiting a multiplicity of spacings, and (2) exploiting a multiplicity of frequencies.

The parallelism is not exact because various sources of error in the observations, especially ionospheric refraction error, will scale somewhat differently in the two cases. Still, the use of widely separated carrier frequencies has an effect substantially similar to that of using a wide range of inter-station spacings.

Just as the use of a closely spaced pair of stations in conjunction with a widely spaced pair facilitates the unique determination of the integer values of the biases of doubly-differenced carrier phase biases, so does the use of a low carrier frequency or a closely spaced pair of carrier frequencies in conjunction with a high carrier frequency or a widely spaced pair of carrier frequencies. Preferably, the use of a multiplicity of station spacings is combined with the use of a multiplicity of frequencies, or frequency spacings.

3. BRIEF DESCRIPTION OF THE DRAWINGS

Serving to illustrate an exemplary embodiment of the invention are the drawings wherein like reference numerals represent like parts:

4. DETAILED DESCRIPTION OF PREFERRED EMBODIMENT

FIG. 1

Figure 1:
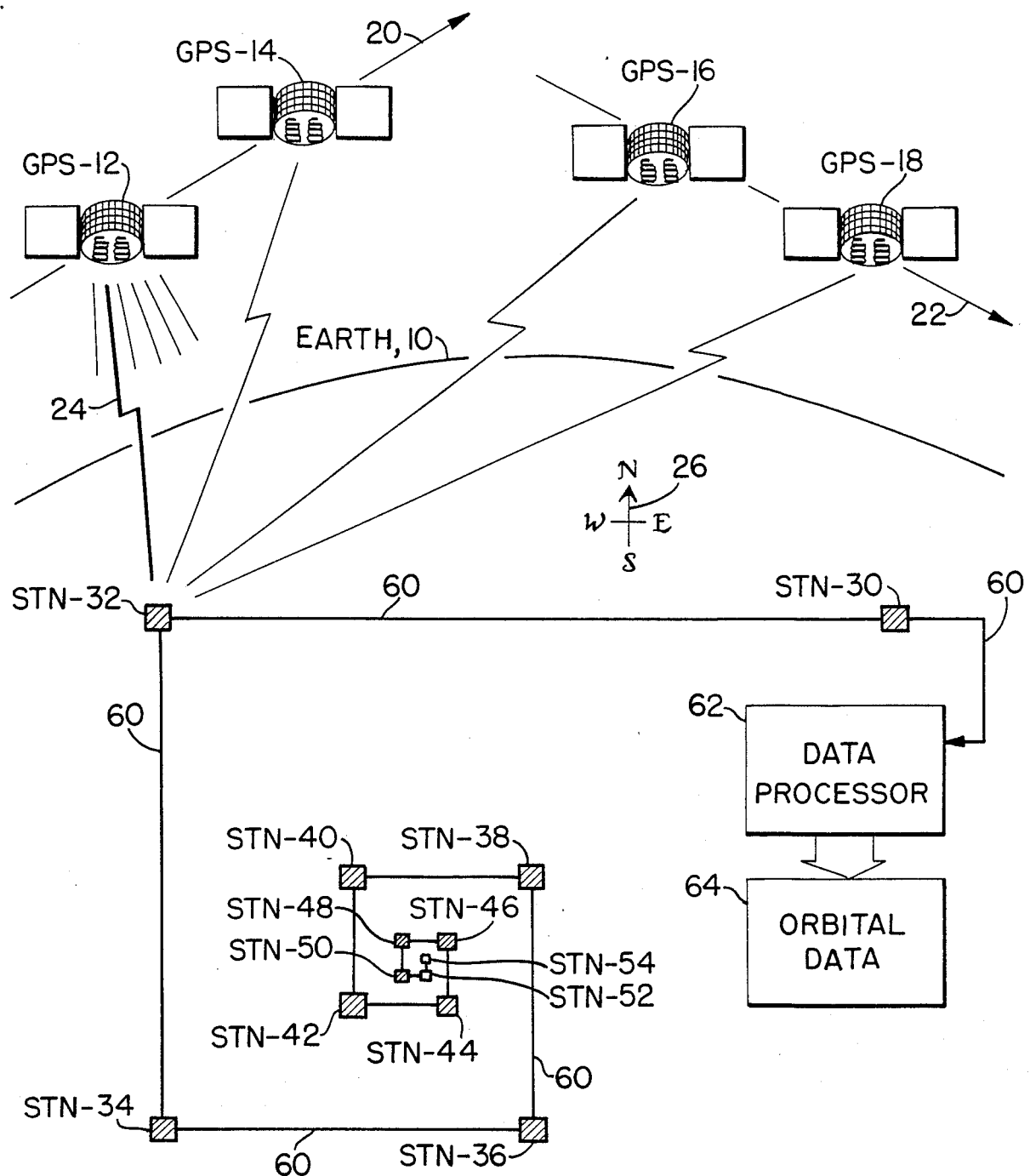
FIG. 1 illustrates a system for determining orbits of GPS satellites using reconstructed carrier phase measurements of signals received at ground stations.

Referring now to FIG. 1, a system is shown in accordance with a preferred embodiment of the present invention for determining the orbits of a plurality of GPS satellites, illustrated by GPS-12 and GPS-14 in geocentric orbit 20, and GPS-16 and GPS-18 in geocentric orbit 22. The satellites are currently visible at stations STN-30, STN-32, STN-34, STN-36, and STN-54 on Earth 10.

Radio signals 24 continuously transmitted by each satellite are concurrently received by means of an antenna, not shown in FIG. 1, at each station STN-30, 32, 34...54. (Only those signals received at STN-32 are illustrated).

Although two satellites, GPS-12 and GPS-14, are illustrated in one orbital plane 20 and two other satellites, GPS-16 and GPS-18, are illustrated as orbiting in another plane 22, other satellite configurations may be treated in accordance with the present invention as long as two or more satellites are simultaneously visible at two or more ground stations, to permit double-differencing of simultaneous phase observations.

It is not necessary, according to the method of the present invention, for a given pair of satellites to be observed simultaneously by different pairs of stations. Two series of doubly-differenced observations, by different pairs of stations at different times, may still be combined to determine the satellite orbits in accordance with the method of the present invention provided that the satellite orbital parameters are substantially the same at the different times. Different pairs of satellites might also be observed at different times by a given pair of stations.

An array of thirteen stations is illustrated although, as mentioned, a different number and/or a different arrangement thereof may be used in accordance with the present invention. A preferred arrangement of stations is drawn approximately to scale, in plan view, and with orientation indicated by compass rose 26 in FIG. 1. Only the plan view of the array is drawn with attention to scale and orientation in FIG. 1, not the small squares marking the stations themselves, the Earth, the satellites, etc. It is understood that an actual array of stations on the surface of the earth will generally not be exactly planar.

In the illustrated array, stations are arranged in a logarithmic spiral with the ratio of the distances between successive pairs of stations being equal to the square root of 2, about 1.4, and with the vectors between successive pairs of stations being perpendicular. Station STN-32 is about 453 kilometers west of STN-30 and 320 kilometers north of STN-34. STN-36 is about 226 kilometers east of STN-34 and 160 kilometers south of STN-38. STN-40 is about 113 kilometers west of STN-38 and 80 kilometers north of STN-42. STN-44 is about 57 kilometers east of STN-42 and 40 kilometers south of STN-46. STN-48 is about 28 kilometers west of STN-46 and 20 kilometers north of STN-50. STN-52 is about 14 kilometers east of STN-50 and 10 kilometers south of STN-54.

Stations STN-34, STN-42, STN-50, STN-54, STN-46, STN-38, and STN-30 lie along a straight line running from southwest to northeast. Stations STN-32, STN-40, STN-48, STN-52, STN-44, and STN-36 lie along a straight line running from northwest to southeast. The distances of the stations from the center defined by the intersection of these southwest-northeast and northwest-southeast axes increase in a geometric progression.

Similarly, the east-west and the north-south inter-station spacings are seen to increase in geometric progression. For example, the north-south spacings are 10, 20, 40, 80, 160, and 320 kilometers.

Data communication link 60 carries phase measurement data from all stations to data processor 62 where they are subject to doubly-differenced processing to generate improved determinations of the orbits of the satellites, represented for example by orbital data 64. Data communication link 60 is illustrated as running around the spiral from STN-54 to STN-52, thence to STN-50, and so on through STN-30, to data processor 62. This has been done to make apparent the logarithmic spiral arrangement of the stations. In practice, however, another data communication route might be more convenient. For example, data processor 62 could be located near the center of the array, at the intersection of the southwest-northeast and the northwest-southeast axes of the array, and four data communication links running in straight lines radially outward could connect data processor 62 to the stations. Moreover, data processor 62 does not need to be separately located; it can be located at one of the stations.

It is not necessary for data communication link 60 to be a permanent or dedicated link, or for data communication to be performed in real time. Phase measurement data generated at each station may be stored locally and transferred whenever convenient to data processor 62 for later processing. A convenient means for such data transfer is the commercial switched telephone network.

The preferred array size, with respect to the number of stations and with respect to inter-station distance, is a function of various considerations as discussed hereinbelow. Typically a minimum distance of the order of magnitude of 10 kilometers and a maximum distance of the order of several hundred kilometers will be preferred if the L1 and L2 band center frequency carrier phases are observed.

So long as appropriate baseline length ratios are observed, neither the size nor the shape of the array is critical, and both aspects may be varied to suit economic and geographic constraints. Provided that the requirements for resolving ambiguities or "fixing biases" are satisfied, better orbit determination accuracy will be obtained if greater inter-station distances are used, and if the distances projected in both of two perpendicular directions, e.g. along north-south and east-west axes, are great. The minimum inter-station distances, preferably as projected in both of two perpendicular directions, should be sufficiently small that the biases of the doubly-differenced phase observations from the most closely spaced stations can be determined uniquely with a high degree of certainty even under less than ideal conditions. The progression of spacings, from minimum to maximum, preferably should not include any ratio so large that biases can not be determined uniquely for the next-larger spacing, given successful determinations for the spacings up to that one.

Reliability is an important aspect of any orbit-determination system. The reliability of accurate orbit determination in accordance with the present invention is enhanced by arraying the stations so that the failure to obtain valid phase observations from any one station does not result in too large a gap in the progression of available inter-station distances from minimum to maximum. In this case, "too large" means that biases can not be determined uniquely for the next-larger spacing, above the gap, given successful determinations for the spacings below the gap. A failure to obtain usable observations from a station might result from an electrical or mechanical malfunction, or from severe local weather which caused the refractivity of the atmosphere above the station to be anomalous.

In this respect a log-periodic array such as the one illustrated in FIG. 1 represents a relatively fault-tolerant, and therefore a reliable, design. From the log-periodicity of this array it is apparent that except for the inner and outer end stations STN-54 and STN-30, the failure of any one station does not result in the total loss of any of the principal inter-station spacings, as projected on north-south and east-west axes. For example, consider station STN-38, which is located 113 kilometers east of STN-40 and 160 kilometers north of STN-36. East-west projected spacings of 113 kilometers are also provided by the pair, STN-34 and STN-42, and by the pair STN-42 and STN-36. North-south projected spacings of 160 kilometers are also provided by the pair, STN-34 and STN-40, and by the pair STN-40 and STN-32.

At a sacrifice in reliability, stations could be removed from the array. The spacing ratio could also be increased, in order to reduce the number of stations required to span the desired range of spacings. The array illustrated represents a relatively conservative, "belt and suspenders" design.

For the sake of reliability it is also desirable to provide redundant or backup means for data communication link 60 and data processor 62.

During operation of the system according to the present invention, measurements are made simultaneously by equipment at each ground station, as shown and discussed below with reference to FIG. 2, of the reconstructed carrier phases of the signals 24 received from each observable satellite GPS 12, 14, 18. The measurements are repeated at a series of such times while the satellites move substantial distances in their orbits.

It is convenient to govern the timing of the measurements at each station by a local clock, as shown and discussed below with reference to FIG. 2, which is synchronized with the clocks at the other stations. Methods of achieving this synchronization by reference to the signals received from one or more of the satellites are known. Therefore, it is not necessary to transmit time synchronization signals through data communication link 60, although this is a possible means for synchronizing the observations and may be preferred, for example, to simplify the apparatus which must be provided at the stations.

The reconstructed carrier phase measurements are preferably carried out in accordance with a regular schedule, such as once per minute, every minute on the minute (as long as a satellite is visible), as indicated by the local clock. In this manner it may be ensured that all stations observe all visible satellites simultaneously.

Equipment suitable for use at a tracking station to receive the GPS satellite signals, reconstruct carrier waves therefrom, and measure the carrier phases without knowledge of the modulating codes is available commercially and is described in the U.S. patent application entitled "METHOD AND SYSTEM FOR DETERMINING POSITION ON A MOVING PLATFORM, SUCH AS A SHIP, USING SIGNALS FROM GPS SATELLITES", Ser. No. 852016, filed on Apr. 14, 1986, which application is a continuation-in-part of the U.S. patent application entitled "METHOD AND SYSTEM FOR MEASURING BASELINE VECTORS BY RADIO INTERFEROMETRY USING RADIO SIGNALS FROM GPS SATELLITES", Ser. No. 353,331, filed on Mar. 1, 1982. Both applications are in the name of Charles C. Counselman III. Suitable equipment which uses locally generated replicas of the GPS codes to perform the same functions is also available commercially.

Data processor 62 is preferably a general purpose digital computer suitable for scientific computation, such as one of the Digital Equipment Corporation's VAX series of minicomputers.

Algorithms suitable for use in data processor 62 have been described, for example, by R. W. King, E. G. Masters, C. Rizos, A. Stolz, and J. Collins in Monograph No. 9, entitled "Surveying with GPS", published by the School of Surveying, The University of New South Wales, Kensington, N.S.W. 2033, Australia; by R. I. Abbot, Y. Bock, C. C. Counselman III, R. W. King, S. A. Gourevitch, and B. J. Rosen, in an article entitled "Interferometric determination of GPS satellite orbits" appearing in the *Proceedings of the First International Symposium on Precise Positioning with the Global Positioning System*, vol. 1, pp. 63–72, 1985; and in an article by Gerhard Beutler, Werner Gurtner, Ivo Bauersima, and Richard Langley entitled "Modelling and Estimating the Orbits of GPS Satellites" also appearing in the *Proceedings of the First International Symposium on Precise Positioning with the Global Positioning System*, vol. 1, pp. 99–112.

An efficient algorithm for processing the carrier phase measurement data from all the stations simultaneously to determine the orbits of the satellites is further described in the paper by Yehuda Bock, Sergei A. Gourevitch, Charles C. Counselman III, Robert W. King, and Richard I. Abbot, entitled "Interferometric Analysis of GPS Phase Observations", appearing in the journal *manuscripta geodaetica*, volume 11, pages 282–288, published in 1986.

As explained in the paper by Bock et al., the most efficient way to combine phase data from an array of stations involves the simultaneous processing of all observations which were made simultaneously. That is, doubly-differenced phase observations are not separately processed for separate pairs of stations, taken two at a time, or for separate pairs of satellites, taken two at a time. Similarly, the most efficient way to process phase data from a plurality of carrier frequencies involves the simultaneous processing of all observations, from all frequencies, together. Accordingly, while the previously noted successive determination of bias integer values is useful conceptually to understand the invention, in actual practice the preferred procedure involves the simultaneous estimation of all relevant parameters. In other words, parallel processing is more efficient than serial.

FIG. 2

Figure 2:
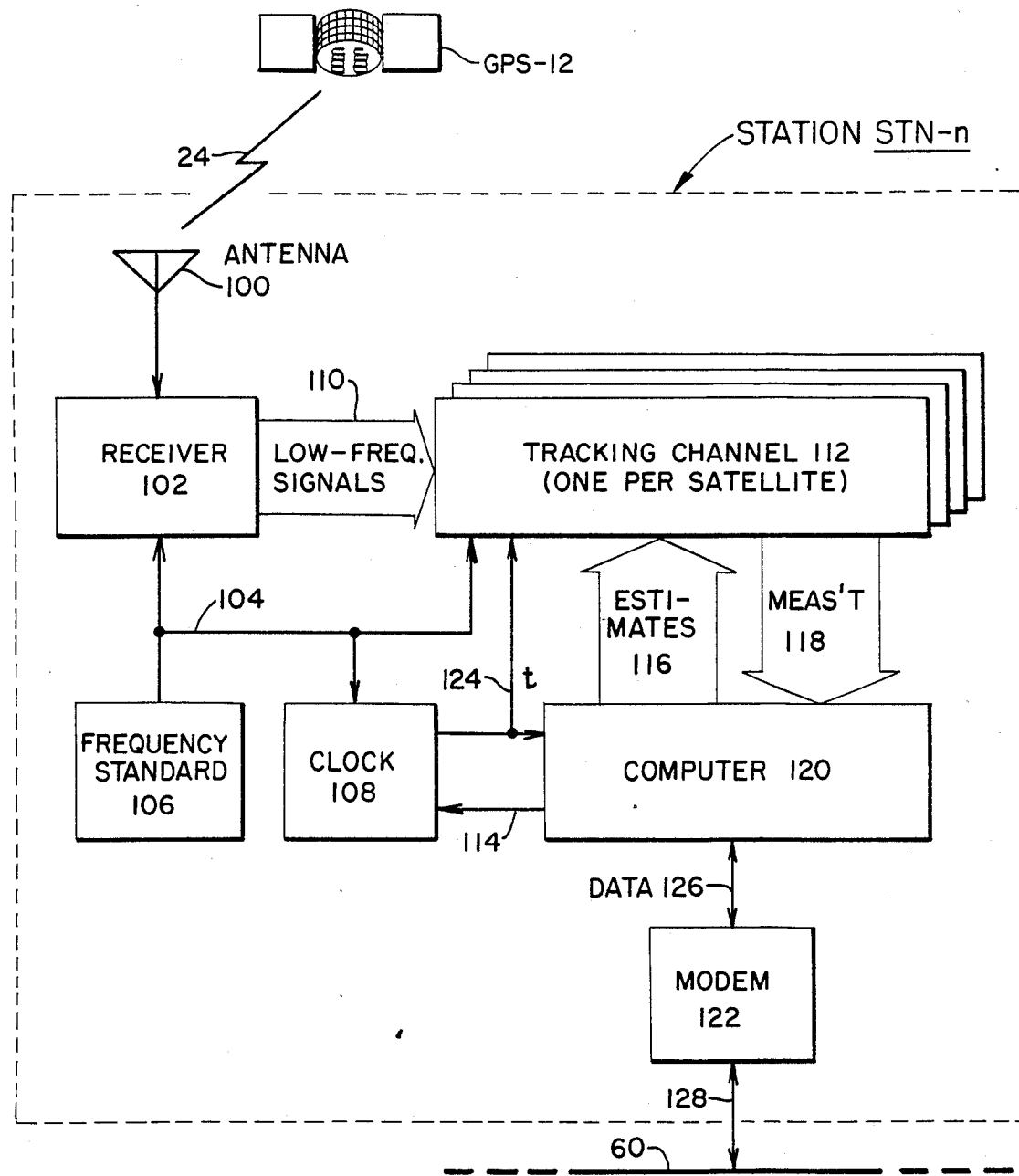
FIG. 2 illustrates a block diagram of a station for receiving GPS signals and making reconstructed carrier phase measurements thereof in accordance with the system shown in FIG. 1.

Referring now to FIG. 2, a block diagram is shown of one of the stations STN-n of the set STN 30, 32, 34, 36, ... 54 at which the signals from the plurality of GPS satellites are received and reconstructed carrier phase measurements are made.

As illustrated in FIG. 1 and FIG. 2, each station STN-n receives concurrently the signals transmitted by each of the GPS satellites GPS-12, GPS-14, GPS-16 and GPS-18, such as signals 24 received from satellite GPS-12. Through data communication link 60, illustratively a commercial switched telephone network, station STN-n communicates with data processor 62, shown in FIG. 1.

Station STN-n includes upward looking omni-directional antenna 100, receiver 102, frequency standard 106, clock 108, a plurality of identical tracking channels 112, computer 120, and modem 122.

Antenna 100, whose phase center is accurately known and positioned with respect to a local geodetic monument, not shown, receives simultaneously the signals transmitted by all satellites in view. Antenna 100 is designed to respond to the signals received directly from the satellites through free space, and to reject signals scattered or reflected from nearby objects or surfaces such as the ground below. Rejection of such scattered or reflected signals is important to prevent them from altering the phases of the received signals which ideally are just the directly received signals.

Because antenna 100 preferably receives signals from the sky and not from the ground, it is called "upward looking". Because antenna 100 receives signals from all directions in the sky, it is also called "omnidirectional". A type of antenna well suited for the present application is disclosed in U.S. Pat. No. 4,647,942 issued Mar. 3, 1987, entitled "CIRCULARLY POLARIZED ANTENNA FOR SATELLITE POSITIONING SYSTEMS". The particular antenna disclosed in U.S. Pat. No. 4,647,942 was designed to receive only one of the GPS bands, the L1 band. A dual-band, L1 and L2, version of the antenna disclosed in U.S. Pat. No.

4,647,942 is available commercially as the antenna of the MACROMETER II ™ Interferometric Surveying System. MACROMETER II is a trademark of Aero Service Division, Western Geophysical Company of America. Antenna 100 is preferably a MACROMETER II antenna or an equivalent.

In the system illustrated in FIG. 2, the relative-position or "baseline" vectors between the phase centers of the antennas at all of the stations, and also the position vector of the phase center of each antenna with respect to the center of mass of the earth, are determined a priori, by known methods, and preferably with better fractional accuracy than is desired for the determinations of the satellite orbits. Errors in the presumed knowledge of these vectors will cause errors in the orbit determinations. However, as discussed above with reference to the paper by Gerhard Beutler, Werner Gurtner, Markus Rothacher, Thomas Schildknecht, and Ivo Bauersima, entitled "Determination of GPS Orbits Using Double Difference Carrier Phase Observations from Regional Networks", appearing in the *Proceedings of the Fourth International Geodetic Symposium on Satellite Positioning*, volume 1, pages 319–335, published in 1986 by the Applied Research Laboratories of the University of Texas at Austin, it is possible to refine the position vectors of the stations simultaneously with the satellite orbits. If this is to be done, appropriate a priori covariances should be assigned to the uncertain station position coordinates.

A composite of the signals simultaneously received from the plurality of satellites by antenna 100 is applied to receiver 102 which converts the signals from the L1 and L2 bands of frequencies at which the signals are received, to low frequencies at which the operations of carrier reconstruction, phase measurement and tracking are more conveniently performed. Frequency down-conversion operations are performed within receiver 102 as disclosed in detail hereinbelow with reference to FIG. 3, by heterodyning the received signals with local oscillator signals. The oscillator signals are synthesized by coherent multiplication of standard frequency signal 104 provided to receiver 102 by frequency standard 106. Carrier reconstruction is also performed within receiver 102. As further disclosed with reference to FIG. 3, a composite of reconstructed carrier components, each related in phase and frequency to a carrier implicit in the composite of spread spectrum signals received by antenna 100, is formed in receiver 102. The reconstructed carrier composite is sampled and the result, in synchronous digital form, is carried by bus 110 to a plurality of identical tracking channels 112. Bus 110 includes separate data lines for the L1 and the L2 bands.

Frequency standard 106 is a stable reference standard, such as a commercially available cesium atomic beam resonator controlled oscillator. It has spectral purity sufficient to permit coherent multiplication to L band, and long term stability and accuracy to permit accurate time-keeping. Standard frequency signal 104 from frequency standard 106 has a frequency equal to 2 $f_0$, or 10.23 MHz.

In addition to being applied to receiver 102, standard frequency signal 104 from frequency standard 106 is applied to and governs the rate of clock 108. As disclosed in detail hereinbelow with reference to FIGS. 3, 4, 5, and 6, clock 108 counts cycles of standard frequency signal 104 to generate real time indication 124 which is applied to and governs the operation of computer 120 and all of the tracking channels 112. Clock 108 of tracking station STN-n is synchronized with the clocks of the other tracking stations by means of synchronization signal 114 generated by computer 120. (Preferably each station autonomously derives the synchronization signal.) As mentioned above with reference to FIG. 1, synchronization signal 114 may be derived by any of a variety of known methods, including decoding of the GPS signal modulation by known means, not shown, included in receiver 102 and/or in one or more of tracking channels 112.

The low frequency, digitized, composite of reconstructed carriers output from receiver 102 on bus 110 is applied identically, in parallel, to all of the tracking channels 112 where the phases of the reconstructed carriers are individually measured. One tracking channel 112 is assigned to each satellite, and selectively detects only carriers from its assigned satellite, using satellite-specific estimates 116 of the time-varying Doppler shift of the signals received from that satellite.

Estimates 116 applied to tracking channels 112 by computer 120 are computed by known methods from a priori information about the satellite orbits and the tracking station position which may conveniently be provided to computer 120 from the central processor 62 via data communication link 60. An alternative source of information about the satellite orbits is the broadcast information which is carried by the satellite signals and which may be read by known methods involving knowledge of the GPS codes.

Data representing the results of carrier phase and related power measurements performed within the tracking channels 112, indicated in FIG. 2 as measurements 118, are provided to computer 120 which may use these measurements to refine estimates 116 and, generally, to monitor and control the measurement processes conducted within the tracking channels. The measurements 118 are stored in the memory of computer 120 until it is desired to transfer them to data processor 62 (FIG. 1).

The transfer to processor 62 of the measurements 118 and related data such as time tags derived from real time indication 124 from clock 108, as well as other data related to the operation and maintenance of station STN-32, uses modem 122, drop 128 and communication link 60.

Data communication link 60 is bidirectional so that information generated by data processor 62 relating to the satellite signals, such as data representing Predictions of the frequencies of these signals, may be transferred to computer 120 through modem 122 and may be used by computer 120 to control or to aid the measurement processes. In particular, estimates 116 applied to tracking channels 112 may be derived partially or wholly from data received by computer 120 from data processor 62 via line 60.

Computer 120 may also generate the clock synchronization signal 114, which is applied to clock 108 in order to initialize real time indication 124, partially or wholly on the basis of data received from data processor 62 via line 60. Alternatively, and as mentioned above, the information necessary to synchronize clock 108 with the clocks in all other stations and with a standard time such as "GPS" time or Coordinated Universal Time, may be wholly or partially derived from the satellite signals received at one of the stations STN-n.

FIG. 3

Figure 3:
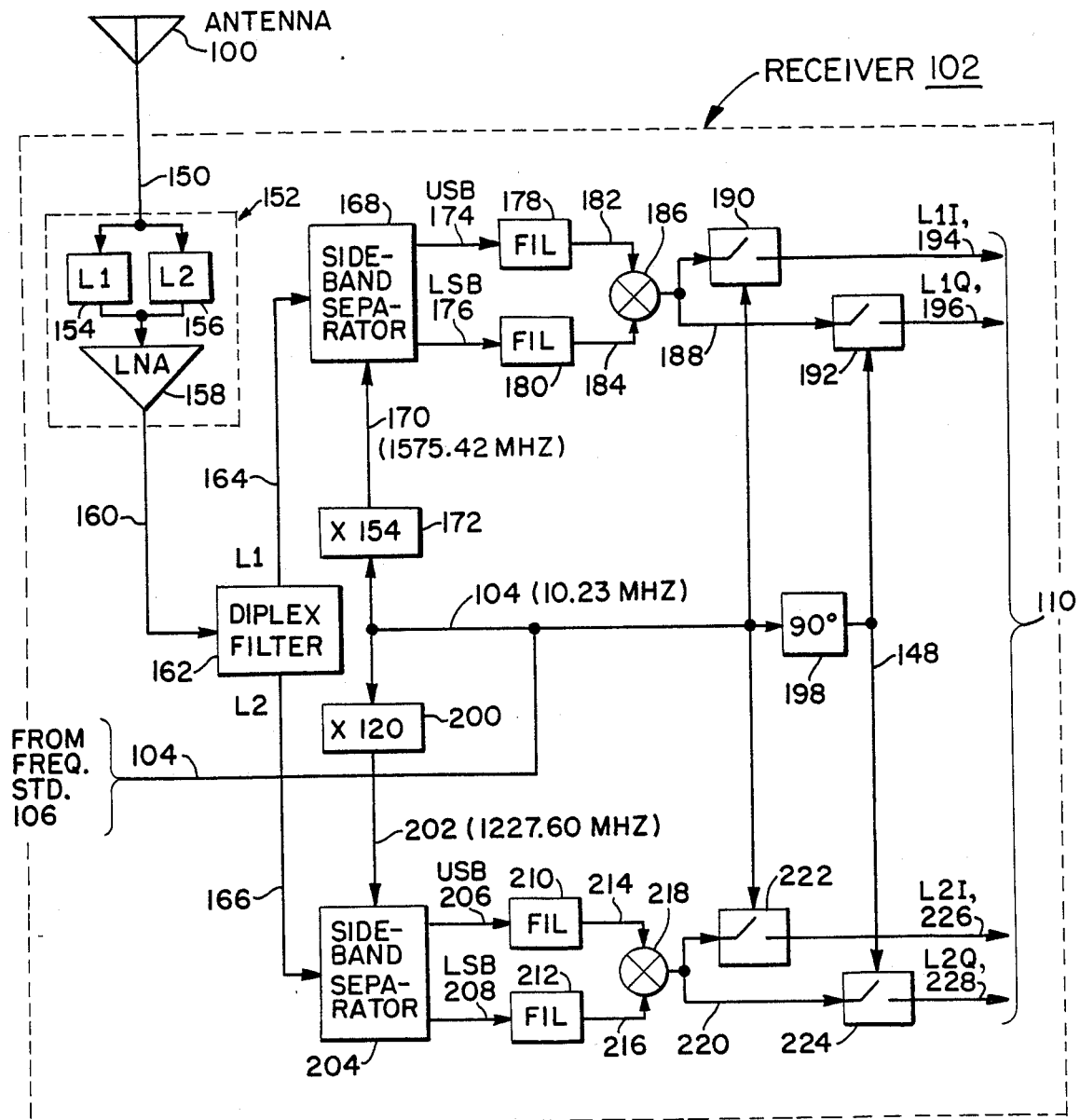
FIG. 3 illustrates a receiver for use in the station shown in FIG. 2.

The receiver 102 shown in FIG. 2 is illustrated in further detail in FIG. 3. Receiver 102 accepts the L1 and L2 band signals simultaneously received from the satellites by antenna 100. The composite of spread spectrum signals received in each of these bands is processed in receiver 102 to generate a composite of reconstructed carrier signals. These L1- and L2-related, reconstructed composite signals are also sampled in receiver 102, and are applied in digital form via bus 110 to the identical tracking channels 112 where individual satellites' reconstructed carrier Phases are measured.

Reference frequency signal 104 from frequency standard 106 is applied to receiver 102 where it governs the frequency down-conversion and sampling operations which are performed in the course of generating low frequency, digital signals on bus 110.

Receiver 102 receives the L band signals from antenna 100 via a transmission line 150 which is coupled in turn to a preamplifier assembly 152 including an L1 band pass filter 154, an L2 band pass filter 156, and a low noise preamplification stage 158. A transmission line 160 carries the filtered and preamplified signals to a diplex filter 162 which supplies the L1 band signals to L1 sideband separator 168. This sideband separator also receives a 1575.42 MHz, L1 band center frequency reference signal 170 generated by a frequency multiplier 172 which is driven by frequency standard 106 through line 104.

L1 sideband separator 168 generates separate upper and lower side band outputs, 174 and 176 respectively, converted from the upper and lower halves of the L1 band to lower frequencies by heterodyning with L1 band center frequency reference signal 170. L1 upper sideband signal 174 and L1 lower sideband signal 176 are filtered by L1 upper sideband filter 178 and L1 lower sideband filter 180 respectively. A mixer 186 receives the outputs of these filters and supplies their product to L1 $22f_0$ in-phase sampler 190 and L1 $2f_0$ quadrature sampler 192. These samplers are synchronized by frequency standard 106 via line 104 in the case of sampler 190, and via a 90 degree phase shifter 198 in the case of sampler 192. The samplers, operating in relative quadrature, supply inputs L1I and L1Q to the tracking channels via bus 110.

The L2 band section of the receiver is similarly organized and includes L2 sideband separator 204, L2 upper sideband filter 210, L2 lower sideband filter 212, mixer 218, L2 $2f_0$ in-phase sampler 222, and L2 $2f_0$ quadrature sampler 224, all as illustrated in FIG. 3.

Returning to the input section of the receiver, the spread-spectrum composite of L1 and L2 band signals simultaneously received from the plurality of satellites is carried from antenna 100 to preamplifier assembly 152 by transmission line 150 which is made as short as possible, preferably less than 1 meter long, in order to minimize losses. Therefore preamplifier assembly 152 should be mounted as close to antenna 100 as practicable with the antenna having a clear view of the sky.

Preamplifier assembly 152 serve to amplify the received signals sufficiently that these signals can be carried a moderately long distance, e.g. via transmission line 160, from the location of antenna 100 and preamplifier assembly 152, to the location of the remaining portion of receiver 102 which may be relatively remote.

Within preamplifier assembly 152 the signals received via transmission line 150 are split and applied to the inputs of L1 band pass filter 154 and L2 band pass filter 156. These are high quality, low loss band pass filters tuned to the L1 and L2 frequency bands, respectively. They are used to prevent any strong out-of-band signals which may be picked up by antenna 100 from reaching the low noise amplifier 158 and possibly burning it out or overloading it or subsequent stages of receiver 102. To provide power to the pre-amplifier, transmission line 160 may also carry d.c. power from a power supply in receiver 102, not shown.

Diplex filter 162 is a frequency selective signal splitter which separates the L1 band signals from the L2 band signals arriving via transmission line 160, and outputs L1 band signals 164 and L2 band signals 166 separately as shown. The L1 band signals 164 are applied to the input of L1 sideband separator 168 and the L2 band signals 166 are applied to the input of L2 sideband separator 204.

L1 sideband separator 168 may be configured conveniently as described in detail in an article in the Proceedings of the IEEE, vol. 59 (1971), pp. 1617–1618, by Alan E. E. Rogers, and further described in United Kingdom Patent No. 2,120,489, published Feb. 26, 1986 and entitled "Method and system for determining position using signals from satellites". L1 upper sideband signal 174 output from L1 sideband separator 168 is a spread spectrum composite representing that portion of L1 band signals 164 having frequencies higher than 1575.42 MHz, the frequency of L1 center frequency reference signal 170. The phase and the frequency of L1 center frequency reference signal 170 are subtracted from the phases and the frequencies of the Fourier components of the higher-frequency half of the spectrum of L1 band signals 164 to obtain the phases and the frequencies of the corresponding Fourier components of L1 upper sideband signal 174.

Similarly, L1 lower sideband signal 176 output from L1 sideband separator 168 is a spread spectrum composite representing that portion of L1 band signals 164 having frequencies lower than 1575.42 MHz, the frequency of L1 center frequency reference signal 170. The phases and the frequencies of the Fourier components of the lower-frequency half of the spectrum of L1 band signals 164 are subtracted from the phase and the frequency of L1 center frequency reference signal 170 to obtain the phases and the frequencies of the corresponding Fourier components of L1 lower sideband signal 176.

As previously noted, L1 upper and lower sideband signals 174 and 176 are applied to upper and lower sideband filters 178 and 180, respectively. These two filters preferably have identical properties. They are used to reject noise and any interfering signals outside the useful range of frequencies in the upper and lower sideband signals 174, 176. This range extends from about 10 kHz to about 9 MHz, except for a narrow band of frequencies centered at $f_0$, or 5.115 MHz. These filters should also provide rejection at a frequency of $2f_0$, or 10.23 MHz.

Except for the rejection of frequencies below about 10 kHz and in a "notch" centered at $f_0$, the shape of each filter passband is preferably matched to the shape of one sideband of the P-code related component of a GPS signal. Thus, the filter has a half-power bandwidth of about 4.5 MHz. The rejection of frequencies below about 10 kHz prevents any L1 band signals received at frequencies less than 10 kHz above or below the L1 band center frequency from reaching mixer 186, where the second harmonics of the 308 $f_0$, L1 band center frequency carrier waves are constructed. These carriers, as received, may have frequencies differing from 308 $f_0$ by up to about 5 kHz in either direction, by virtue of Doppler shift. Their second harmonics are Doppler-shifted by plus or minus up to 10 kHz. Thus the low-frequency cutoffs of filters 178 and 180 prevent interference with the reconstructed L1 band center frequency carriers.

Similarly, the notch centered at $f_0$ in filters 178 and 180 prevents L1 band signals received at frequencies near 307 $f_0$ and 309 $f_0$ from interfering with the L1 band, $f_0$ subcarriers. The second harmonics of these carriers are also reconstructed in mixer 186. The frequencies of these reconstructed second harmonics as they appear in L1 product 188 are near 2 $f_0$, and differ from 2$f_0$ by up to about 30 Hz in either direction, due to Doppler shift. The range of frequencies of these signals is relatively narrow, and the notches of filters 178 and 180 could be made equally narrow. However, it is more convenient to provide much wider notches, of the order of 10 kHz or even 100 kHz centered on 2$f_0$. Even with the larger notch width, a relatively small fraction of the desired signal power is lost since this power is spread over a bandwidth of several MHz.

Except for narrow ranges of frequencies near the 10 kHz low-frequency cutoff and the 5.115 MHz rejection notch, and for frequencies beyond about 9 MHz where little signal power is found, filters 178 and 180 should have phase shifts which are within a few degrees of a linear function of frequency. In other words, the filters should be nondispersive. This property is required for the phase-coherent combination of spectral components from throughout the useful frequency range, in the carrier reconstruction in mixer 186. Filters 178 and 180 having all the properties specified herein may be configured using known techniques, for example by cascading 10 kHz high-pass and 5.115 MHz notch filters with a phase-linear low-pass filter approximately matched to the P-code modulation bandwidth.

The L1 product 188 which is generated by mixer 186 is applied to L1 2$f_0$ in-phase sampler 190 and L1 2$f_0$ quadrature sampler 192 as shown. L1 2$f_0$ in-phase sampler 190 samples L1 product 188 at a uniform rate of 2$f_0$, or 10.23 MHZ, in accordance with standard frequency signal 104 received from frequency standard 106. L1 2$f_0$ quadrature sampler 192 also samples L1 product 188 at a uniform rate of 2$f_0$, or 10.23 MHz, in accordance with standard frequency signal 104 received from frequency standard 106. However, the phase of the sampling by L1 2$f_0$ quadrature sampler 192 lags that of L1 2$f_0$ in-phase sampler 190 because L1 2$f_0$ quadrature sampler 192 is driven by quadrature sampling frequency signal 148, generated by a 90° phase shifter 198 which delays standard frequency signal 104 by one-quarter cycle of phase.

Figure 4:
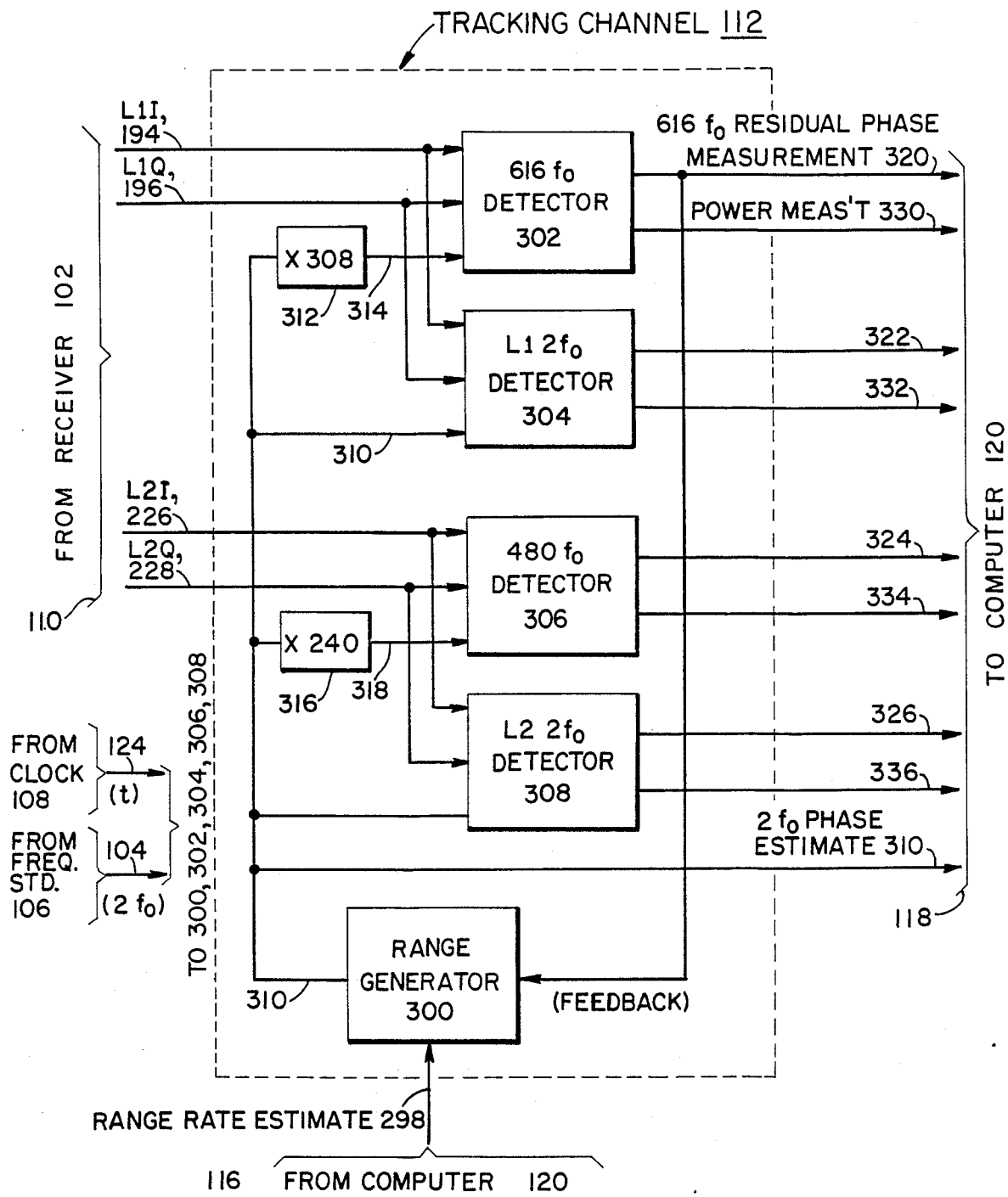
FIG. 4 illustrates one of the tracking channels used in the station shown in FIG. 2.

L1 2$f_0$ in-phase sampler 190 generates L1 in-phase sampled product 194 which is a digital signal, preferably including only one bit per sample, to indicate just the sign. Similarly, L1 2$f_0$ quadrature sampler 192 generates L1 quadrature sampled product 196 which is of the same form. Limiting these sampled products to one bit simplifies the subsequent digital signal processing circuitry, while degrading the signal to noise ratios tolerably. L1 in-phase sampled product 194 provides the "L1I" input to each tracking channel 112, and L1 quadrature sampled product 196 provides the "L1Q" input to each tracking channel 112, as shown in FIGS. 3 and 4. The L1 in-phase and quadrature sampled products 194 and 196 respectively, are carried, together with similar signals from the L2 band section of receiver 102, via bus 110 to the tracking channel 112.

The digital sampling rate, equal to 2$f_0$, greatly exceeds the frequencies of the reconstructed L1 center frequency carriers, all less than 10 kHz, in L1 product 188. Thus, the frequencies and phases of these reconstructed carriers are preserved in the sampling process. The sampling rate of 2$f_0$ is nominally exactly equal to the second harmonic of the $f_0$ carrier implicit in the signals transmitted by each satellite. As received, and after the frequency-doubling which occurs in the carrier reconstruction process, these carriers have frequencies differing from the 2$f_0$ sampling rate by amounts between minus and plus about 30 Hz. L1 2$f_0$ in-phase sampler 190 and L1 2$f_0$ quadrature sampler 192 act as mixers, subtracting the 2$f_0$ sampling frequency from the reconstructed carrier frequencies near 2$f_0$ to yield reconstructed carrier frequencies in L1 in-phase sampled product 194 and L1 quadrature sampled product 196 in the range from minus to plus 30 Hz. Note that negative frequencies are distinct from positive frequencies in these sampled products because the two samplers operate in phase quadrature.

In the preferred embodiment as illustrated in FIG. 3, the signal to noise ratio of the reconstructed $f_0$ carriers is degraded by noise appearing in L1 product 188 at frequencies in the zero to 30 Hz range. Although the degradation is tolerable, performance of the system can be improved if desired, by providing a separate pair of quadrature samplers like L1 2$f_0$ in-phase sampler 190 and L1 2$f_0$ quadrature sampler 192, but connected to mixer 186 by a band-pass filter tuned to the desired frequency band, centered at 2$f_0$ in this case. These samplers and the related band-pass filter, none of which is shown in FIG. 3, would be in addition to those shown. The L1I and L1Q signals applied to 616 $f_0$ detector 302 in tracking channel 112, disclosed below with reference to FIG. 4, would continue to be derived from L1 2$f_0$ in-phase sampler 190 and L1 2$f_0$ quadrature sampler 192, as shown. The added pair of samplers would drive L1 2$f_0$ detector 304 (described hereinafter with reference to FIG. 4) in tracking channel 112. Similar additions and changes could be made for the L2 section of receiver 102 and tracking channel 112.

As shown in FIG. 3, the L2 section of receiver 102 is organized like the L1 section. L2 band signals 166 output by diplex filter 162 are applied to L2 sideband separator 204 which heterodynes these signals with L2 center frequency reference signal 202. L2 center frequency reference signal 202 has a frequency of 240 $f_0$, equal to 1227.60 MHz, and is derived from 2$f_0$ standard frequency signal 104 by frequency multiplication in x120 frequency multiplier 200. Except for the difference in inputs, L2 sideband separator 204 operates exactly like, and may be constructed exactly as, L1 sideband separator 168.

L2 sideband separator 204 generates separate L2 upper sideband signal 206 and L2 lower sideband signal 208 outputs at baseband, representing the upper and lower frequency halves of the spectrum of the L2 band, just as disclosed above with reference to L1 sideband separator 168. The L2 upper and lower sideband signals 206, 208 are applied to L2 upper and lower sideband filters 210, 212, respectively. Except for the difference in inputs, these filters operate exactly like, and may be constructed exactly as, L1 upper sideband filter 178 and L1 lower sideband filter 180.

Filtered L2 upper and lower sidebands signal 214 and 216, output from the filters 210 and 212, respectively, are applied to mixer 218 which operates like mixer 186 in the L1 section of receiver 102. L2 product 220 output from mixer 218 is applied to L2 $2f_0$ in-phase sampler 222 and L2 $2f_0$ quadrature sampler 224 which, again, are exactly like their counterparts in the L1 section: that is, L1 $2f_0$ in-phase sampler 190 and L1 $2f_0$ quadrature sampler 192. L2 in-phase sampler 222 samples L2 product 220 in response to standard frequency signal 104, and L2 quadrature sampler 224 samples L2 product 220 in response to quadrature sampling frequency signal 148 which is derived, as mentioned above, by delaying the phase of standard frequency signal 104 in 90° phase shifter 198.

The output of the in-phase sampler 222 is L2 in-phase sampled product 226, also labeled "L2I" in FIGS. 3 and 4. The output of quadrature sampler 224 is L2 quadrature sampled product 228, also labeled "L2Q" in FIGS. 3 and 4. In these outputs which are derived from the signals received in the L2 band just as discussed above for the L1-related signals, a plurality of reconstructed carrier components is found, including both a reconstructed second harmonic of the center frequency carrier and a reconstructed second harmonic of the $f_0$ subcarrier implicit in the L2 band signals from each visible satellite. The reconstructed carriers are distinguished by their different Doppler shifts. The Doppler shift of each carrier is proportional to its frequency as transmitted, and to the rate of change of the satellite-to-receiver range (sometimes called the "range rate", or the "line-of-sight velocity").

FIG. 4

Referring now to FIG. 4, one of the plurality of identical tracking channels 112 shown in FIG. 2 is illustrated in detail. As shown in FIG. 4, tracking channel 112 includes a range generator 300 which receives a satellite-specific range rate estimate 298, included in estimates 116 from computer 120, and generates therefrom a $2f_0$ phase estimate 310 which is used by four synchronous detectors to detect and measure the phases of four reconstructed carriers of the particular satellite to which this tracking channel 112 is assigned. These carriers are the L1 band center frequency carrier, the L2 band center frequency carrier, the $f_0$ subcarrier implicit in the L1 band signals, and the $f_0$ subcarrier implicit in the L2 band signals.

L1 in-phase samPled product 194 and L1 quadrature sampled product 196 from receiver 102, received by tracking channel 112 via bus 110, are applied to 616 $f_0$ detector 302 which detects the second harmonic of the 308 $f_0$, L1 band center frequency carrier. The product signals 194, 196 are also applied to L1 $2f_0$ detector 304 which detects the second harmonic of the $f_0$, L1 band subcarrier. Similarly, L2 in-phase sampled product 226 and L2 quadrature sampled product 228 from receiver 102, also received by tracking channel 112 via bus 110, are applied to 480 $f_0$ detector 306 which detects the second harmonic of the 240 $f_0$, L2 band center frequency carrier, and also to L2 $2f_0$ detector 308 which detects the second harmonic of the $f_0$, L2 band subcarrier.

Each of the four synchronous detectors in tracking channel 112 also receives an estimate of the time-varying phase of the particular carrier which it is supposed to detect, and each produces a measurement of the difference between the actual carrier phase and the estimate of this phase. All four carrier phase estimates, one for each carrier to be detected, are derived by multiplying $2f_0$ phase estimate 310, generated by range generator 300 from range rate estimate 298, by appropriate factors. This is appropriate since all four carriers were generated from the same fundamental frequency source within the same satellite, and since all have equal fractional frequency shifts due to the Doppler effect. The $2f_0$ phase estimate 310 is applied directly, that is without multiplication, to L1 $2f_0$ detector 304 and L2 $2f_0$ detector 308. The same $2f_0$ phase estimate 310 is multiplied by a factor of 308 in ×308 multiplier 312 whose output, estimate 314, is applied to 616 $f_0$ detector 302. The same $2f_0$ phase estimate 310 is multiplied by a factor of 240 in ×240 multiplier 316 whose output, estimate 318, is applied to 480 $f_0$ detector 306.

The 616 $f_0$ detector 302 produces 616 $f_0$ residual phase measurement 320, a measurement of the difference between the actual phase of the reconstructed, second harmonic, L1 center frequency carrier of the selected satellite and the 616 of the $f_0$ carrier implicit in the signals transmitted by each $f_0$ phase estimate 314.

L1 $2f_0$ detector 304 produces L1 $2f_0$ residual phase measurement 322, a measurement of the difference between the actual phase of the reconstructed, second harmonic, L1 band $f_0$ subcarrier of the selected satellite and the $2f_0$ phase estimate 310.

The 480 $f_0$ detector 306 produces 480 $f_0$ residual phase measurement 324, a measurement of the difference between the actual phase of the reconstructed, second harmonic, L2 center frequency carrier of the selected satellite and the 480 $f_0$ phase estimate 318.

L2 $2f_0$ detector 308 produces L2 $2f_0$ residual phase measurement 326, a measurement of the difference between the actual phase of the reconstructed, second harmonic, L2 band $f_0$ subcarrier of the selected satellite and the $2f_0$ phase estimate 310.

Each of the four synchronous detectors also produces a measurement of the power of the related carrier. Thus, 616 $f_0$ detector 302 produces L1 center frequency carrier power measurement 330; L1 $2f_0$ detector 304 produces L1 subcarrier power measurement 332; 480 $f_0$ detector 306 produces L2 center frequency carrier power measurement 334; and L2 $2f_0$ detector 308 produces L2 subcarrier power measurement 336.

Each synchronous detector, such as 616 $f_0$ detector 302 which detects the reconstructed, second harmonic, L1 center frequency carrier of the selected satellite, selectively detects the signal received from the selected satellite and rejects signals from other satellites because, virtually always, the desired satellite's reconstructed carrier signal differs in frequency from the undesired satellite's. Each synchronous detector responds only to input signal frequencies which are very near to the frequency, that is the rate, of the related carrier phase estimate, such as 616 $f_0$ phase estimate 314 which is supplied to 616 $f_0$ detector 302.

The phase estimate supplied to each synchronous detector is applied within the detector to the input signals, such as L1I and L1Q, in order to subtract the phase estimate from the phases of the input signals. As discussed above with reference to FIG. 3, the input signals include a plurality of reconstructed carrier components, from all visible satellites. One of these input signal components, the desired component, has phase varying with time at very nearly the same rate as the phase estimate.

Following the subtraction of the phase estimate from the composite signal, the phase of the desired component is therefore virtually static, so this signal component may be distinguished from noise and other signals by integrating the composite signal for an interval of time. Such an integration is performed within each synchronous detector, such as the 616 $f_0$ detector 302, as disclosed further below with reference to FIG. 5.

In order for this method of signal selection to work, of course, the rate of the phase estimate applied to the synchronous detector must match the phase rate, or frequency, of the desired signal component sufficiently accurately. Because range rate estimate 298 from computer 120 might not be sufficiently accurate, range generator 300 also receives an input from 616 $f_0$ residual phase measurement 320 which serves as an error signal and is applied in range generator 300 to correct 2$f_0$ phase estimate 310. Thus a closed feedback loop is formed which includes the range generator 300, the ×308 multiplier 312, and the 616 $f_0$ detector 302. This loop acts as a phase-locked tracking loop to track the phase of the L1 center frequency carrier of the signals received from the selected satellite.

Only the L1 center frequency carrier, not the other carriers reconstructed from the received signals, is tracked within tracking channel 112; and the 2$f_0$ phase estimate 310 which is phase-locked to this carrier is, or is the basis for, the phase estimate applied to each of the four synchronous detectors in tracking channel 112. It is preferred to base all the carrier phase estimates for a given satellite on the L1 center frequency carrier because the signal-to-noise ratio of this reconstructed carrier is the highest. However, a working system could be constructed in which the phase estimates were derived in other ways.

The four carrier power measurements, L1 center frequency carrier power measurement 330, L1 subcarrier power measurement 332, L2 center frequency carrier power measurement 334, and L2 subcarrier power measurement 336, are included in measurements 118 along with 2$f_0$ phase estimate 310 and the four residual phase measurements: 616 $f_0$ residual phase measurement 320, L1 2$f_0$ residual phase measurement 322, 480 $f_0$ residual phase measurement 324, and L2 2$f_0$ residual phase measurement 326. The latter measurements are called "residual" phase measurements because each represents only the residual, or difference, between the related actual and estimated carrier phase. Addition of each residual phase measurement value to the related phase estimate yields the total value of the "one-way phase" measurement for the related carrier. Such additions are conveniently performed in computer 120, although they might also be performed in central data processor 62.

FIG. 5

Figure 5:
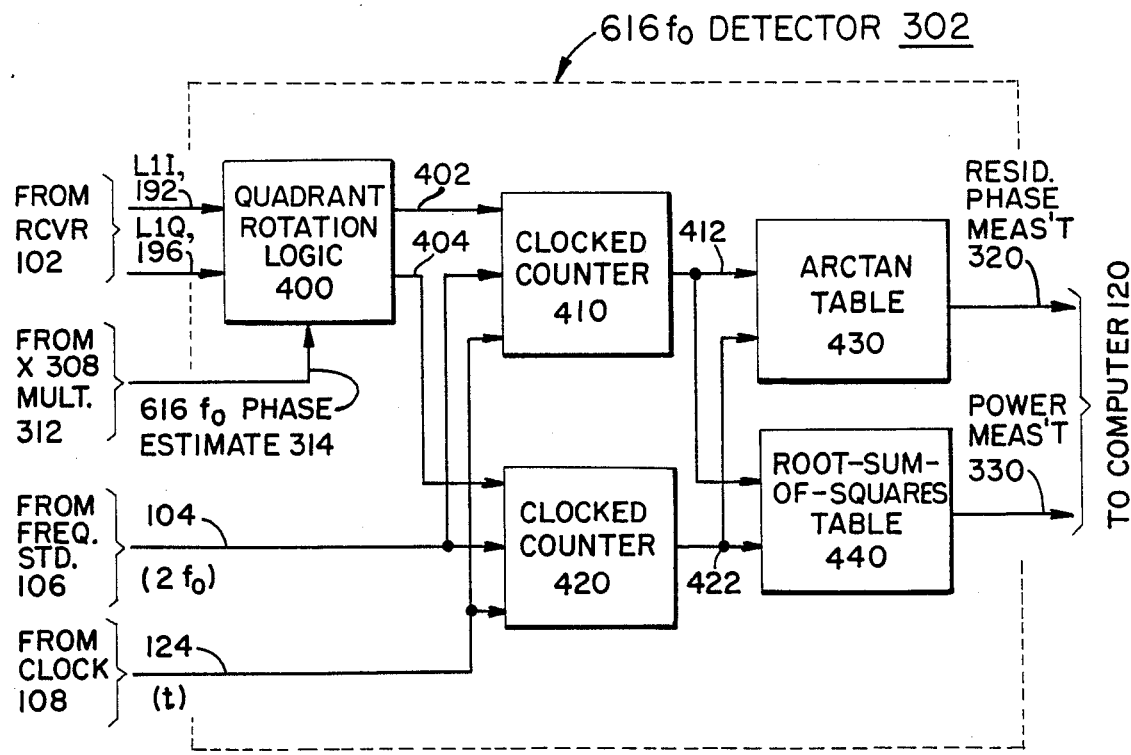
FIG. 5 illustrates one of the synchronous detectors used in the tracking channel shown in FIG. 4.

To further describe the detectors, the 616 $f_0$ detector 302 is shown in detail in FIG. 5. It is convenient to construct all four detectors identically although the preferred value of signal integration time is not the same for all four. As discussed hereinbelow, the preferred integration time for 616 $f_0$ detector 302 is 1 second, whereas the preferred integration time for detectors 304, 306 and 308 is 100 seconds.

While the construction and operation of the other detectors may be understood from the description of detector 302, a subtle difference should be noted between the operations of the two center frequency carrier detectors (616 $f_0$ detector 302 and 480 $f_0$ detector 306) on one hand, and the two subcarrier detectors (L1 2$f_0$ detector 304 and L2 2$f_0$ detector 308) on the other. This difference arises not from any differences between the detectors themselves, but from a difference between the center frequency carriers and the subcarriers as they appear in the I and Q inputs.

As mentioned above with reference to FIG. 3, the reconstructed center frequency carriers appear with frequencies in the range from zero to about 10 kHz in L1 product 188. The frequency of a reconstructed center frequency carrier in L1 product 188 is equal to twice the magnitude (i.e., twice the absolute value) of the Doppler shift of the related, 308 $f_0$, L1 band center frequency carrier. Positive and negative Doppler shifts of equal magnitude yield the same frequency in L1 product 188. A consequence of this Doppler "imaging" is a 3 dB loss of signal to noise ratio (SNR). A less important consequence is the possibility of interference between two satellites having equal magnitude, opposite Doppler shifts. Such interference occurs in practice but so rarely, and so briefly, that it can be ignored. The imaging and the consequent SNR loss could be eliminated by the addition of a quadrature counterpart of mixer 186 in receiver 102. Actual experience has shown such an addition to be unnecessary, so it is omitted from the preferred system disclosed herein.

Closely related to the occurrence of center frequency Doppler "imaging" is the fact that each reconstructed center frequency carrier appears with virtually the same phase in both L1I and L1Q. This is contrary to what one expects in a pair of signals labeled "I" and "Q".

The reconstructed f° subcarriers, unlike the reconstructed center frequency carriers, do not suffer from Doppler imaging in the "I" and "Q" signals from receiver 102. Each reconstructed subcarrier signal appears in Q with phase differing by 90° from its phase in I. The sense of this phase difference, leading or lagging, depends on whether the Doppler shift is positive or negative. Thus, I and Q Provide a rotating "phasor" description of a reconstructed subcarrier signal.

The phasor concept is helpful to understanding the operations of all the synchronous detectors, and will be used in the following description of the operation of the 616 $f_0$ detector 302 despite the fact that the phasor representing the reconstructed L1 center frequency carrier signal does not properly rotate about the origin of the I-Q plane; rather, it oscillates on a line of unit slope. It will be recalled that such a linearly oscillating phasor is the sum of two rotating phasors of equal magnitude, with equal rotation rates, rotating in opposite directions. The 616 $f_0$ detector 302 responds to one of these phasors and rejects the other, just as it rejects phasors of other satellites. In the following description of detector operation the rejected phasor will be ignored. Thus, the same description can be taken to apply to all four detectors.

By way of briefly summarizing the description to this point, the 616 $f_0$ detector 302 receives as inputs from receiver 102, L1 in-phase sampled product 194, "L1I", and L1 quadrature sampled product 196, "L1Q". L1I and L1Q were generated in the receiver 102 by sampling L1 product 188 from mixer 186 as shown in FIG. 3. Present in both L1I and L1Q is a composite of reconstructed carrier signals, simultaneously including signals from all visible satellites. The reconstructed center frequency carrier of the L1 band signal received from the particular satellite to which tracking channel 112 has been assigned is selected by the 616 $f_0$ detector 302.

The selection is based on an estimate of the time-varying phase of this specific carrier encoded in 616 $f_0$ phase estimate 314 which is generated by ×308 multiplier 312. Both 2$f_0$ phase estimate 310 and 616 $f_0$ phase estimate 314 are binary digital signals, and ×308 multiplier 312 is a digital multiplier.

The 2$f_0$ phase estimate 310 which is generated by range generator 300 is updated at a fixed rate of 2$f_0$/93, or exactly 110 KHz, in accordance with 2$f_0$ standard frequency signal 104 from frequency standard 106 and real time indication 124 from clock 108 (FIGS. 2, 3). The ×308 multiplier 312 operates to update 616 $f_0$ phase estimate 314 at the same rate.

It is convenient to derive a 2$f_0$/93 synchronous "clock" signal for controlling the phase estimate generation and related multiplications, by dividing 2$f_0$ standard frequency signal 104 by factors of 31 and 3 by means of digital dividers included in clock 108 but not shown in FIG. 2. Further divisions, first by a factor of 11 and then by successive factors of 10, yield a digital representation of the time in decimal seconds. The clock signals corresponding to the 1-second and the 100-second decimal digits are used to control integration functions performed within synchronous detectors 302, 304, 306, and 308 as described above with reference to FIG. 4 and below with reference to FIG. 5.

As shown in FIG. 5, the 616 $f_0$ phase estimate 314 is applied to the I and Q signals, (L1 in-phase sampled product 194 and L1 quadrature sampled product 196), in quadrant rotation logic 400. From these three digital input signals, quadrant rotation logic 400 generates another pair of digital "I" and "Q" signals, in-phase rotated signal 402 and quadrature rotated signal 404.

As will be recalled, each of L1 in-phase sampled product 194 and L1 quadrature sampled product 196 is a one-bit digital signal. The two bits taken together indicate the quadrant of the phasor representing the composite of all the reconstructed L1 carriers. Similarly, each of in-phase rotated signal 402 and quadrature rotated signal 404 is a one-bit digital signal. These two bits taken together also indicate the quadrant of a phasor representing the composite of all the reconstructed L1 carriers. However, the latter phasor is rotated with respect to the former phasor, through the action of quadrant rotation logic 400, by an angle equal (modulo 360 degrees) to 616 $f_0$ phase estimate 314.

As mentioned, 616 $f_0$ phase estimate 314 represents phase in the form of a binary number. The unit of this representation is one cycle of phase. The first two bits to the right of the binary point therefore indicate the quadrant of 616 $f_0$ phase estimate 314. These two bits of 616 $f_0$ phase estimate 314 are combined with the two bits of L1 in-phase sampled product 194 and L1 quadrature sampled product 196 in quadrant rotation logic 400 to generate the two output bits, in-phase rotated signal 402 and quadrature rotated signal 404. This logic must operate at a clock rate of 2$f_0$, the rate of the one-bit I & Q signal inputs. The truth table of this logic may readily be completed from the foregoing description, and is given in the U. S. patent application entitled "METHOD AND SYSTEM FOR DETERMINING POSITION ON A MOVING PLATFORM, SUCH AS A SHIP, USING SIGNALS FROM GPS SATELLITES", Ser. No. 852016, filed on Apr. 14, 1986 in the name of Charles C. Counselman III.

In-phase rotated signal 402 is integrated for an interval of time to distinguish the selected signal component from the noise and other components present in the composite, by means of clocked counter 410. Similarly, quadrature rotated signal 404 is integrated by means of clocked counter 420. The two counters are identical in construction and operation. The integrations by these counters are started and stopped by real time indication 124 from clock 108. As mentioned above, the integration time interval is 1 second in the case of 616 $f_0$ detector 302, and 100 seconds for the other three detectors in tracking channel 112. In 616 $f_0$ detector 302, an integration begins every second on the second. At these times clocked counter 410 and clocked counter 420 are reset to zero and commence counting. Each counter is clocked by standard frequency signal 104 from frequency standard 106. On every cycle of this 2$f_0$ clock signal, each counter is incremented if and only if its input, in-phase rotated signal 402 for clocked counter 410 and quadrature rotated signal 404 for clocked counter 420, is TRUE. At the end of the integration time interval, the accumulated count in clocked counter 410 is read out as inphase accumulation 412, and the accumulated count in clocked counter 420 is read out as quadrature accumulation 422.

In-phase accumulation 412 and quadrature accumulation 422 taken together form the address used to read a memory in which two precomputed numerical tables are stored. From arctangent table 430, the value of 616 $f_0$ residual phase measurement 320 is read, and from root-sum-of-squares table 440, the value of L1 center frequency carrier power measurement 330 is read. These values are included in measurements 118 which are passed from tracking channel 112 to computer 120 as shown in FIGS. 2 and 4.

The theory of operation of the clocked counters 410 and 420 and the tables 430 and 440 are explained in the aforementioned U.S. patent application entitled "METHOD AND SYSTEM FOR DETERMINING POSITION ON A MOVING PLATFORM, SUCH AS A SHIP, USING SIGNALS FROM GPS SATELLITES", Ser. No. 852,016, filed on Apr. 14, 1986 which application is a continuation-in-part of the U.S. patent application entitled "METHOD AND SYSTEM FOR MEASURING BASELINE VECTORS BY RADIO INTERFEROMETRY USING RADIO SIGNALS FROM GPS SATELLITES", Ser. No. 353,331, filed on Mar. 1, 1982, both in the name of Charles C. Counselman III.

An explanation of the operation of similar clocked counters and arctangent and root-sum of-squares tables in a system very similar to 616 $f_0$ detector 302 is also given in United Kingdom Patent No. 2,120,489, published Feb. 26, 1986 and entitled "Method and system for determining position using signals from satellites". Comparison of the system illustrated in United Kingdom Patent No. 2,120,489 with the system illustrated in FIG. 5 herein shows that the two systems are equivalent except for the inclusion of L1 quadrature sampled product 196 and related logic in quadrant rotation logic 400.

FIG. 6

Figure 6:
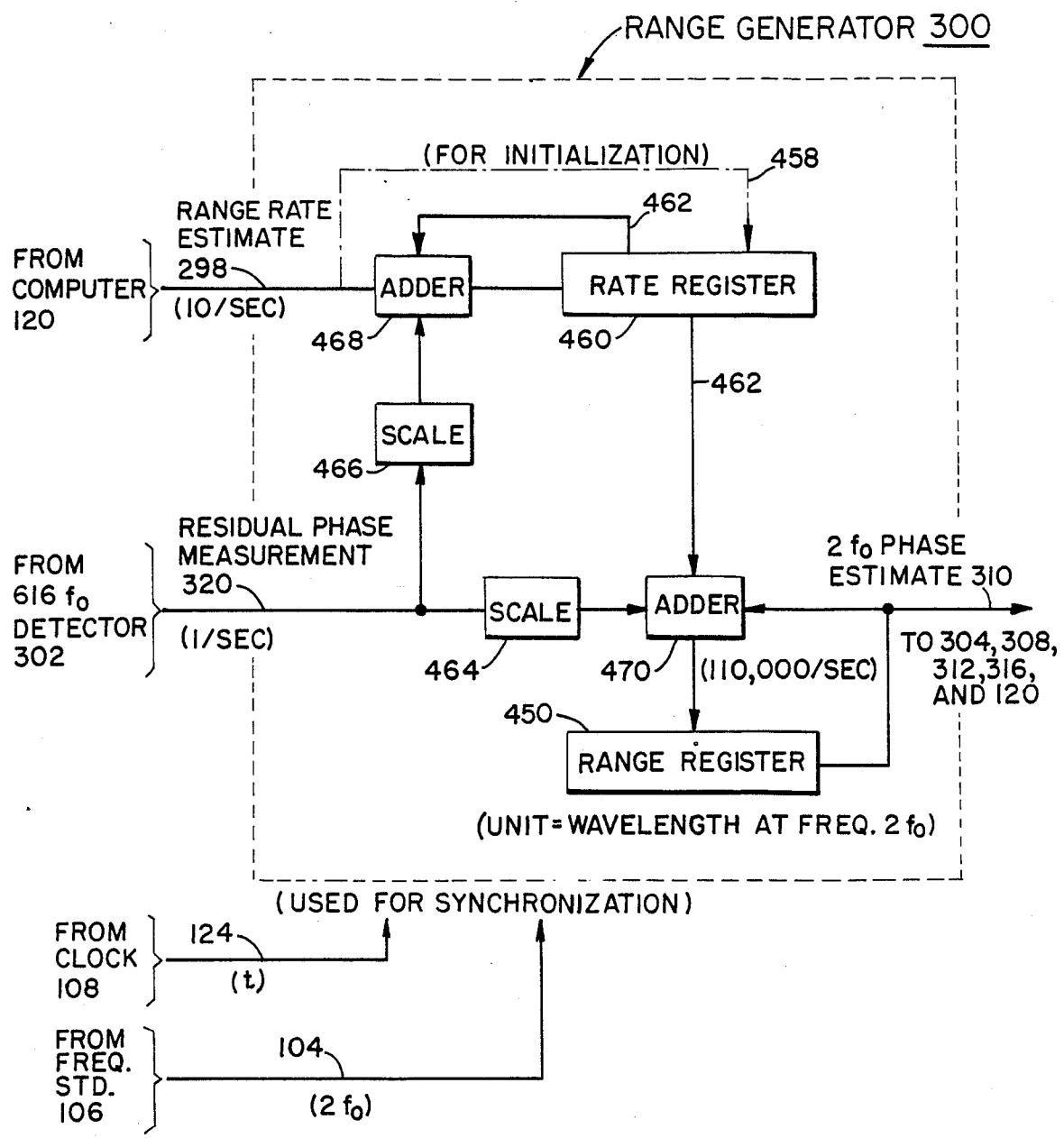
FIG. 6 illustrates the range generator used in the tracking channel shown in FIG. 4.

The range generator 300 shown in FIG. 4 is illustrated in further detail in FIG. 6. As shown in these Figures, range generator 300 receives satellite-specific range rate estimate 298 from computer 120 and generates 2$f_0$ phase estimate 310 which is applied directly or indirectly to all four synchronous detectors in tracking channel 112. The 2$f_0$ phase estimate 310 is applied directly to detectors 304 and 308, to detector 302 via ×308 multiplier 312, and to detector 306 via the ×240 multiplier 316. In the quadrant rotation logic 400 within each detector, the relevant phase estimate is used to rotate the input composite-signal phasor at just the right rate to counter, and stop, the rotation of the particular phasor component representing the carrier component which is to be detected.

As shown in FIG. 6, range generator 300 includes two digital registers, range register 450 and rate register 460. Range register 450 contains a binary number representing a biased estimate of range between the antenna 100 of tracking station STN-n, and the particular satellite, such as GPS-12, to which this tracking channel 112 is assigned. The range is represented in units equal to one wavelength at a frequency of $2f_0$, approximately 29 meters. Range register 450 is a 58-bit binary register with 20 bits to the left and 38 bits to the right of the binary point. The number contained in range register 450 is $2f_0$ phase estimate 310. As disclosed above with reference to FIGS. 4 and 5, just the first two bits to the right of the binary point of this number are applied directly to the quadrant rotation logic 400 in L1 $2f_0$ detector 304 and L2 $2f_0$ detector 308. Twelve or more bits to the right of the binary point of $2f_0$ phase estimate 310 are needed by $\times 308$ multiplier 312 and $\times 240$ multiplier 316 in order to generate 616 $f_0$ phase estimate 314 and 480 $f_0$ phase estimate 318, respectively, with sufficient precision. Sixteen or more bits to the right, and 20 bits to the left of the binary point of $2f_0$ phase estimate 310 are included in the measurements 118 output to computer 120 as shown in FIGS. 2, 4, and 6.

As mentioned above, $2f_0$ phase estimate 310 is updated at a uniform rate 110,000 times per second. At this rate, the number ($2f_0$ phase estimate 310) in range register 450 is replaced with the sum, computed in adder 470, of $2f_0$ phase estimate 310 plus range increment 462 which is contained in rate register 460. Once per second, a new value of 616 $f_0$ residual phase measurement 320 is received from 616 $f_0$ detector 302, is rescaled in scale converter 464, and the result is added into the sum formed by adder 470.

Range increment 462 represents the time rate of change of $2f_0$ phase estimate 310 in units equal to 110,000 kHz, that is, 110,000 cycles of phase per second. Like range register 450, rate register 460 and adders 468 and 470 require 38 bits to the right of the binary point. However, rate register 460 and adder 468 need have no bits to the left of the binary point.

As disclosed above with reference to FIG. 4, the addition once per second of a scaled value of 616 $f_0$ residual phase measurement 320 into $2f_0$ phase estimate 310 is part of a feedback control process which causes $2f_0$ phase estimate 310 to track the L1 band center frequency carrier phase. It would be natural for scale converter 464 to divide 616 $f_0$ residual phase measurement 320 by a factor of 308. However, it is simpler, and acceptable since only an error signal is being processed at this stage, for scale converter 464 just to shift 616 $f_0$ residual phase measurement 320 by 8 bits to the right. This shift is equivalent to division by 256.

The feedback process is also effected by adding 616 $f_0$ residual phase measurement 320, after scaling by scale converter 466, into rate register 460 by means of adder 468. Ten times per second, the value (i.e., range increment 462) in rate register 460 is replaced by the sum, formed in adder 468, of the current value in rate register 460 and the value of range rate estimate 298 received from computer 120. Once per second, the scaled value of 616 $f_0$ residual phase measurement 320 is also added into this sum. Since phase tracking errors, represented by 616 $f_0$ residual phase measurement 320, are accumulated in rate register 460 whose contents are further accumulated in range register 450, the feedback loop is a second-order loop. The loop dynamics, such as the transient response and bandwidth, are determined by the scale factors applied to 616 $f_0$ residual phase measurement 320 in scale converter 464 and scale converter 466. The optimal value of loop bandwidth, given the stability of the frequency standards of the existing GPS satellites, is equal to about 0.5 Hz. To set the bandwidth, the scale factor applied in scale converter 466 may be set in accordance with known techniques of feedback control.

The phase locked loop is rate-aided by computer 120 which furnishes an updated range rate estimate 298 ten times per second to adder 468. Range rate estimate 298 represents the amount by which range increment 462 is expected to change each 0.1 second. Thus, range rate estimate 298 represents a prediction of the acceleration of $2f_0$ phase estimate 310. In order to load an initial range increment 462 into rate register 460, a path 458 bypassing adder 468 is provided.

What is claimed is:

1. A method of determining orbital data from doubly differenced phase observations of satellites derived from stations defining a network of baselines, comprising:
   (a) arranging the stations to provide a wide ranging progression of baseline lengths, from short to long;
   (b) applying observations from a long baseline to enhance observations from a substantially shorter baseline by resolving ambiguity in said short baseline observations;
   (c) applying the enhanced observations from the short baseline to enhance observations from a longer baseline by resolving ambiguity in said longer baseline observations; and
   (d) applying the enhanced observations to enhance the orbital data determination.

2. The method of claim 1, wherein:
   a plurality of said satellites transmit code-modulated, spread-spectrum, suppressed-carrier signals simultaneously on the same frequencies; and
   the phase observations are related to a plurality of carrier waves implicit in the signals received at each station and are derived from these signals independently of externally derived knowledge of the information content of the codes modulating these carriers.

3. The method of claim 2, further comprising:
   using an upward looking omnidirectional antenna at a station to collect a first composite signal simultaneously including overlapping spread-spectrum signals received from a plurality of satellites;
   reconstructing the first composite signal to form a second composite signal simultaneously including a discrete reconstructed carrier component from each of the plurality of satellites;
   using Doppler differences to separate reconstructed carrier components corresponding to the same implicit frequency transmitted by different satellites; and
   measuring the phases of the separated reconstructed carrier components of a plurality of satellites simultaneously.

4. The method of claim 2, further comprising:

deriving phase observations related to a plurality of implicit carriers having a first frequency and a substantially different second frequency in the transmissions of each satellite, said first and second frequencies being the same for different satellites; and using phase observations related to the second frequency to enhance observations related to the first frequency by resolving ambiguity in the latter observations.

5. The method of claim 1, further comprising:
arranging the stations to provide a wide ranging progression of baseline projections on two orthogonal axes.

6. The method of claim 1, further comprising:
arranging the stations to provide a geometric progression of baselines.

7. The method of claim 5 or 6, further comprising:
arranging the stations to provide redundant baselines.

8. The method of claim 1, further comprising:
applying modulation delay observations of the satellites to enhance the orbital data determination.

9. The method of claim 8, further comprising:
applying modulation delay observations of the satellites to enhance ambiguity resolution.

10. An improved method of determining orbital data from doubly differenced phase observations of satellites derived from stations defining a network of baselines, wherein the improvement comprises:
  (a) arranging the stations to provide a wide ranging progression of baseline lengths, from short to long;
  (b) applying observations from a long baseline to enhance observations from a substantially shorter baseline by resolving ambiguity in said short baseline observations;
  (c) applying the enhanced observations from the short baseline to enhance observations from a longer baseline by resolving ambiguity in said longer baseline observations; and
  (d) applying the enhanced observations from the longer baseline to enhance the orbital data determination.

11. The method of claim 10, wherein:
a plurality of said satellites transmit code-modulated, spread-spectrum, suppressed-carrier signals simultaneously on the same frequencies; and
the phase observations are related to a plurality of carrier waves implicit in the signals received at each station and are derived from these signals independently of externally derived knowledge of the information content of the codes modulating these carriers.

12. The method of claim 11, further comprising:
using an upward looking omnidirectional antenna at a station to collect a first composite signal simultaneously including overlapping spread-spectrum signals received from a plurality of satellites;
reconstructing the first composite signal to form a second composite signal simultaneously including a discrete reconstructed carrier component from each of the plurality of satellites;
using Doppler differences to separate reconstructed carrier components corresponding to the same implicit frequency transmitted by different satellites; and
measuring the phases of the separated reconstructed carrier components of a plurality of satellites simultaneously.

13. The method of claim 11, additionally comprising:
deriving phase observations related to a plurality of implicit carriers having a first frequency and a substantially different second frequency in the transmissions of each satellite, said first and second frequencies being the same for different satellites; and
using phase observations related to the second frequency to enhance observations related to the first frequency by resolving ambiguity in the latter observations.

14. The method of claim 10, further comprising:
arranging the stations to provide a wide ranging progression of baseline projections on two orthogonal axes.

15. The method of claim 10, further comprising:
arranging the stations to provide a geometric progression of baselines.

16. The method of claim 14 or 15, further comprising:
arranging the stations to provide redundant baselines.

17. The method of claim 10, further comprising:
applying modulation delay observations of the satellites to enhance the orbital data determination.

18. The method of claim 17, further comprising:
applying modulation delay observations of the satellites to enhance ambiguity resolution.

* * * * *